(12) United States Patent
Hori

(10) Patent No.: US 11,068,062 B2
(45) Date of Patent: Jul. 20, 2021

(54) DISPLAY DEVICE AND METHOD FOR CANCELLING A USER SELECTED FEATURE ON A GRAPHICAL USER INTERFACE ACCORDING TO A CHANGE IN DISPLAY DEVICE ROTATION

(71) Applicant: SONY CORPORATION, Tokyo (JP)

(72) Inventor: Takuro Hori, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/402,225

(22) PCT Filed: May 7, 2013

(86) PCT No.: PCT/JP2013/002933
§ 371 (c)(1),
(2) Date: Nov. 19, 2014

(87) PCT Pub. No.: WO2014/002359
PCT Pub. Date: Jan. 3, 2014

(65) Prior Publication Data
US 2015/0145788 A1 May 28, 2015

(30) Foreign Application Priority Data
Jun. 26, 2012 (JP) .............................. JP2012-142951

(51) Int. Cl.
*G06F 3/01* (2006.01)
*G06F 3/0488* (2013.01)
*G06F 3/0346* (2013.01)
*H04N 5/232* (2006.01)

(52) U.S. Cl.
CPC ............ *G06F 3/017* (2013.01); *G06F 3/0346* (2013.01); *G06F 3/04883* (2013.01); *H04N 5/23216* (2013.01); *H04N 5/23245* (2013.01); *H04N 5/23258* (2013.01)

(58) Field of Classification Search
CPC ........ G06F 3/017; G06F 3/0346; G06F 3/041; G06F 3/0412; G06F 3/044; G06F 3/045; G06F 3/048; G06F 3/03547; G06F 3/0414; G06F 3/042; G06F 3/046; G06F 3/047; G06F 3/0482
USPC .................................................. 345/173–179
See application file for complete search history.

(56) References Cited

U.S. PATENT DOCUMENTS

| | | | | |
|---|---|---|---|---|
| 10,168,872 | B2* | 1/2019 | Hori ..................... | G06F 3/04883 |
| 2007/0004451 | A1* | 1/2007 | C. Anderson ......... | G06F 1/1626 |
| | | | | 455/556.1 |
| 2007/0291018 | A1* | 12/2007 | Park .................... | G06F 3/03547 |
| | | | | 345/184 |
| 2008/0084399 | A1* | 4/2008 | Chua ...................... | G06F 3/038 |
| | | | | 345/173 |
| 2009/0061947 | A1* | 3/2009 | Park ...................... | G06F 1/1624 |
| | | | | 455/566 |

(Continued)

FOREIGN PATENT DOCUMENTS

JP 2010-211303 A 9/2010

*Primary Examiner* — Alexander Eisen
*Assistant Examiner* — Nelson Lam
(74) *Attorney, Agent, or Firm* — Chip Law Group

(57) ABSTRACT

A display device includes processing circuitry that is configured to return, to an initial state, a display screen of the display device that displays a selection of a user-selected feature on a graphical user interface in response to a change in posture of the display device by a predetermined amount.

18 Claims, 21 Drawing Sheets

(56) References Cited

U.S. PATENT DOCUMENTS

| | | | | |
|---|---|---|---|---|
| 2010/0110034 A1* | 5/2010 | Teng | G06F 3/0485 | 345/173 |
| 2010/0222112 A1* | 9/2010 | Han | G06F 3/04883 | 455/566 |
| 2010/0281374 A1* | 11/2010 | Schulz | G06F 3/0482 | 715/723 |
| 2011/0053641 A1* | 3/2011 | Lee | G06F 1/1626 | 455/556.1 |
| 2011/0161884 A1* | 6/2011 | Dugan | G06F 1/1626 | 715/843 |
| 2011/0254792 A1* | 10/2011 | Waters | G06F 1/1626 | 345/173 |
| 2012/0056830 A1* | 3/2012 | Suzuki | G06F 1/1626 | 345/173 |
| 2012/0056878 A1* | 3/2012 | Miyazawa | G06F 1/1626 | 345/419 |
| 2013/0111384 A1* | 5/2013 | Kim | G06F 3/048 | 715/765 |
| 2013/0201113 A1* | 8/2013 | Hinckley | G06F 3/0487 | 345/173 |
| 2013/0222236 A1* | 8/2013 | Gardenfors | H04L 51/24 | 345/156 |
| 2013/0234948 A1* | 9/2013 | Jian | G06F 3/0487 | 345/169 |
| 2014/0337791 A1* | 11/2014 | Agnetta | G06F 3/0485 | 715/784 |
| 2016/0282952 A1* | 9/2016 | Slonneger | G06F 3/0346 | |
| 2019/0095068 A1* | 3/2019 | Suzuki | G06F 3/0346 | |

* cited by examiner

FIG. 7

| TYPE OF INFORMATION PROCESSING DEVICE | MODE OF INFORMATION PROCESSING DEVICE | X AXIS | Y AXIS | Z AXIS |
|---|---|---|---|---|
| IMAGING DEVICE | PHOTOGRAPHING MODE | ○ | ○ | — |
| | REPRODUCTION MODE | — | — | ○ |
| MOBILE TELEPHONE | COMMON | — | — | ○ |

ROTATE BY 45 DEGREES
HAVING Y AXIS AS
ROTATION AXIS

START DRAGGING

ROTATE BY 45 DEGREES
HAVING Y AXIS AS
ROTATION AXIS

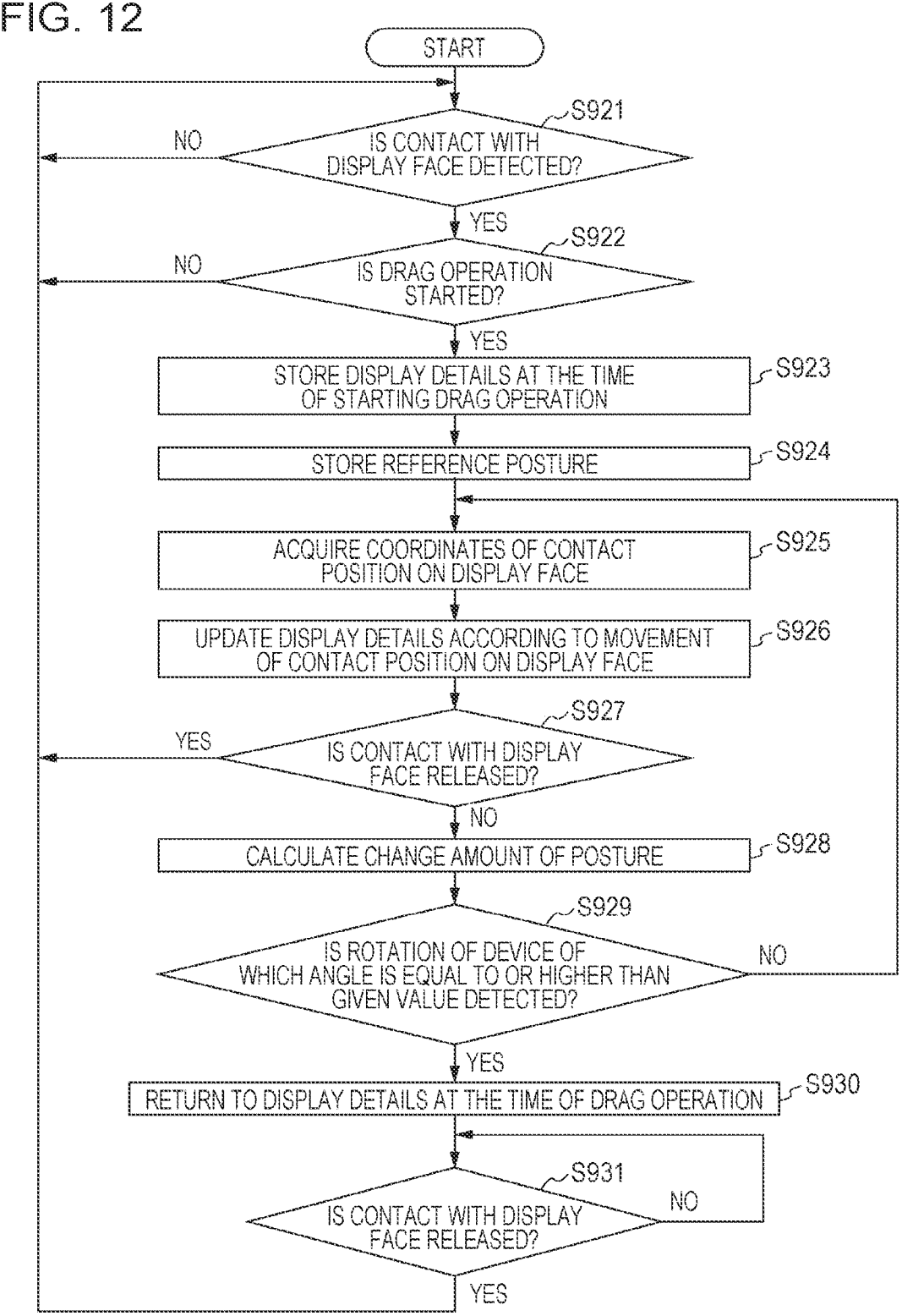

FLICK OPERATION

ANIMATION DISPLAY

ROTATE BY 45 DEGREES HAVING Y AXIS AS ROTATION AXIS

FIG. 15

| RANGE OF FLICKING SPEED (V) | TRANSFER AMOUNT |
|---|---|
| V < V0 | 0 (NOT PROCESSED AS FLICKING) |
| V0 ≤ V < V1 | 5 ITEMS TRANSFERRED |
| V1 ≤ V < V2 | 10 ITEMS TRANSFERRED |
| V2 ≤ V | 15 ITEMS TRANSFERRED |

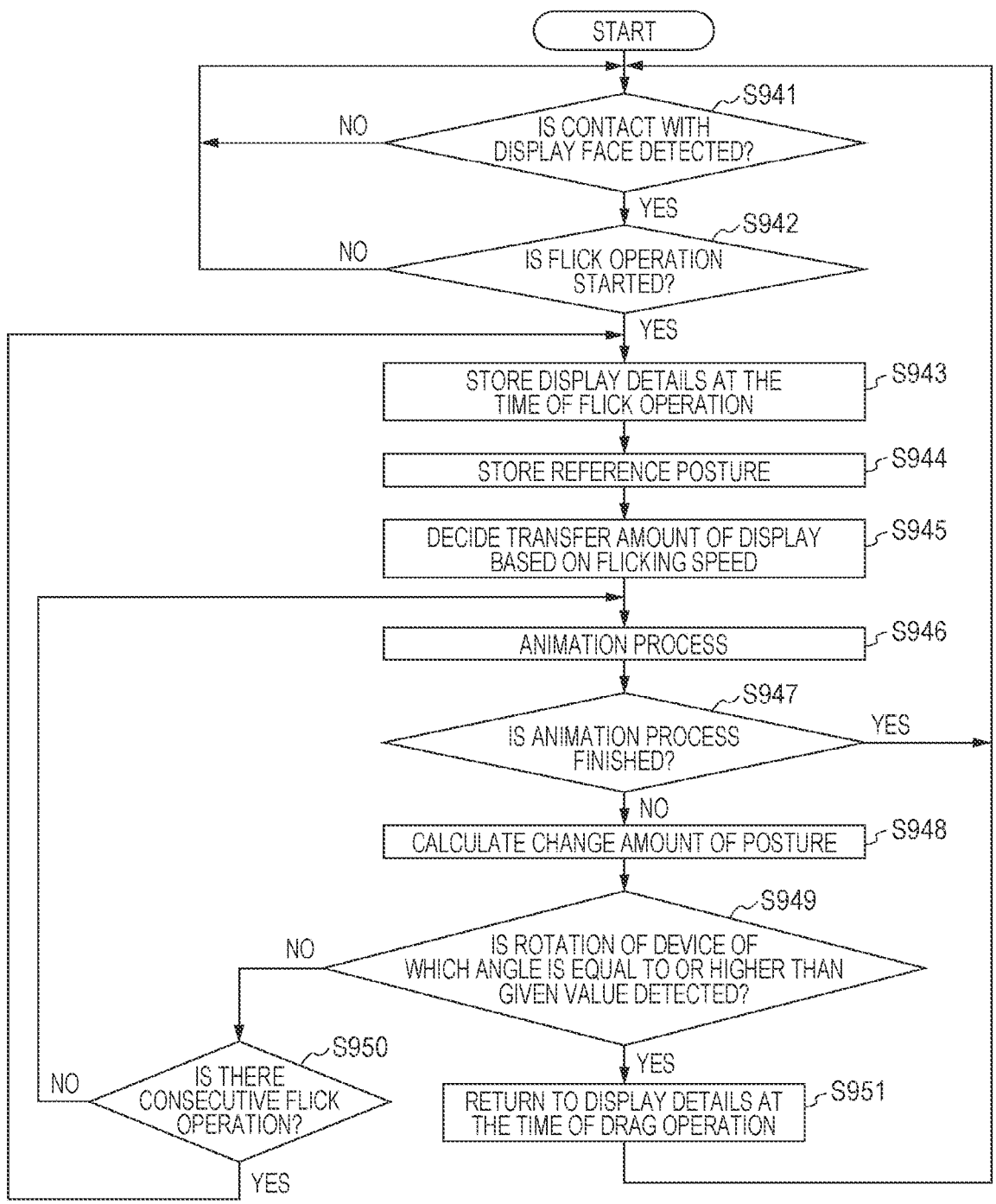

BRING FINGER IN PROXIMITY TO DISPLAY FACE

ROTATE BY 45 DEGREES
HAVING Y AXIS AS
ROTATION AXIS

DISPLAY DEVICE AND METHOD FOR CANCELLING A USER SELECTED FEATURE ON A GRAPHICAL USER INTERFACE ACCORDING TO A CHANGE IN DISPLAY DEVICE ROTATION

TECHNICAL FIELD

The present technology relates to an information processing device. Specifically, the present technology relates to an information processing device and an information processing method which enable execution of each process based on a user operation, and a computer-readable recording medium on which a program for causing a computer to execute the method is recorded.

BACKGROUND ART

In the past, information processing devices such as mobile telephones and digital still cameras having a plurality of functions had been distributed. In addition, there is an information processing device which causes a menu screen, on which a user performs each operation to execute a desired function, to be displayed on a touch panel and then which executes the function according to an operation input on the touch panel.

For example, an input system, in which a process is executed in accordance with an operation position on an operation face at which an operation is input and motion information relating to a motion of a device at the time of detecting the operation position, is proposed (for example, refer to PTL 1).

CITATION LIST

Patent Literature

PTL 1: JP 2010-211323A

SUMMARY

Technical Problem

In the related art described above, for example, since a function assigned for an operation target on a touch panel can be changed based on inclination of a device, a plurality of functions can be assigned for one operation target.

However, it is also assumed that, after a user operation is performed, it becomes necessary to cancel a process caused by the operation. Thus, also in such a case, it is important to cancel the process caused by the user operation with ease.

It is desirable for the present technology to cancel a process caused by a user operation with ease.

Solution to Problem

According to one embodiment, a device is described that includes processing circuitry configured to return to an initial state a selection of a user-selected feature on a user interface in response to a change in posture of the device by a predetermined amount.

According to an information processing method, the method includes displaying a user-selected feature on a user interface of a device and returning via processing circuitry the user-selected feature to an initial state in response to a change in posture of the device by a predetermined amount.

According to a non-transitory computer readable storage device embodiment, the storage device has computer readable instructions stored thereon that when executed by processing circuitry perform a method, the method includes displaying a user-selected feature on a user interface of a device and returning via the processing circuitry the user-selected feature to an initial state in response to a change in posture of the device by a predetermined amount.

Advantageous Effects of Invention

According to the present technology, an excellent effect in which a process caused by a user operation can be cancelled with ease is exhibited.

BRIEF DESCRIPTION OF DRAWINGS

FIG. 7 is a diagram showing an example of the relationship between a rotation axis used when a cancellation operation is performed and the information processing device according to the first embodiment of the present technology.

FIG. 12 is a flowchart showing an example of a procedure of an operation input process by the information processing device according to the second embodiment of the present technology.

FIG. 15 is a diagram showing an example of the relationship between a transfer amount and a flicking speed in a flick operation performed in the information processing device according to the third embodiment of the present technology.

FIG. 16 is a flowchart showing an example of a procedure of an operation input process by the information processing device according to the third embodiment of the present technology.

DESCRIPTION OF EMBODIMENTS

Hereinafter, preferred embodiments for implementing the present technology (hereinafter, referred to as embodiments) will be described. Description will be provided in the following order.

1. First Embodiment (User operation control: An example in which a pressing operation is cancelled with a rotation operation of an information processing device)
2. Second Embodiment (User operation control: An example in which a drag operation is cancelled with a rotation operation of an information processing device)
3. Third Embodiment (User operation control: An example in which a flick operation is cancelled with a rotation operation of an information processing device)
4. Fourth Embodiment (User operation control: An example in which a process caused by proximity to a display face is cancelled with a rotation operation of an information processing device)
5. Fifth Embodiment (User operation control: An example in which a contact operation or a proximity operation on a display face is confirmed and then the operation is cancelled with a rotation operation of an information processing device)
6. Sixth Embodiment (User operation control: An example in which an operation using a predetermined operation member is cancelled with a rotation operation of an information processing device)

1. First Embodiment

External Configuration Example of an Information Processing Device

Figure 1A:
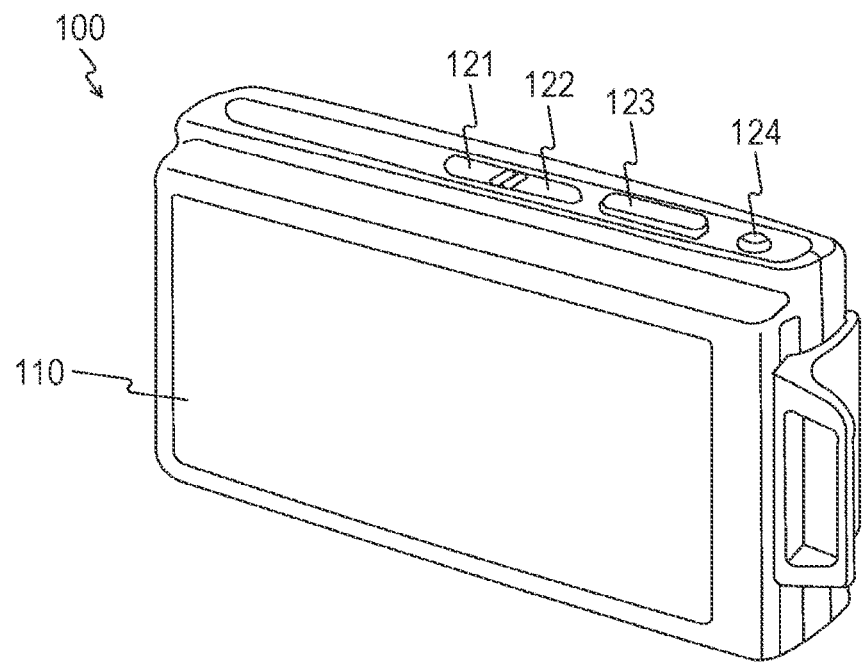
FIG. 1 is a perspective diagram showing an external configuration of an information processing device according to a first embodiment of the present technology.
Figure 1B:
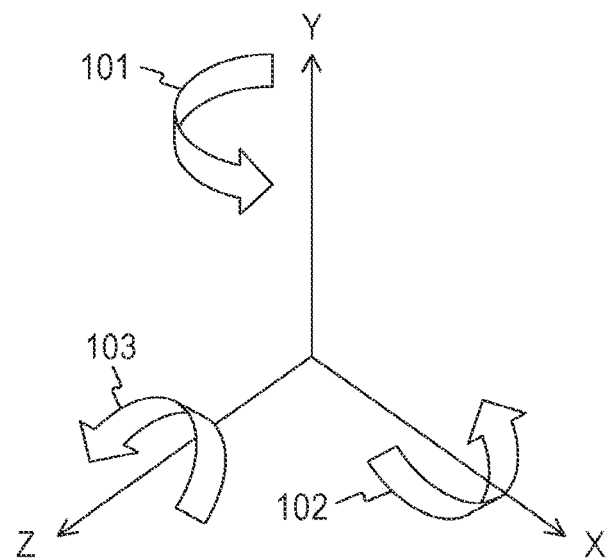

FIG. 1A is a perspective diagram showing an external configuration of an information processing device 100 according to a first embodiment of the present technology. Note that FIG. 1A shows the appearance of one face of the information processing device 100 (that is, the face on which a touch panel 110 is provided). In addition, FIG. 1B shows rotation axes when a posture of the information processing device 100 is changed.

The information processing device 100 generates, for example, image data by imaging subjects and then records this image data as image content, and is realized by a digital still camera, a digital video camera (for example, a camera-integrated recorder), or the like, which can display the content.

The information processing device 100 includes the touch panel 110 and operation members 121 to 124.

The touch panel 110 displays various images, and receives operation inputs from a user by detecting a contact operation (or proximity operation) for the touch panel 110.

The operation member 121 is a power button, and the operation member 122 is a reproduction button. In addition, the operation member 123 is a shutter button pressed by a photographer when image data (captured image) generated by imaging a subject is recorded as image content (a still image file). The operation member 124 is a zoom lever (tele/wide). In addition, the operation members 121 to 124 correspond to an operation unit 120 shown in FIG. 4, and control signals (operation signals) with regard to pressing/release of pressing each of the operation members 121 to 124 are input to a CPU 160 shown in FIG. 4.

Note that, in the information processing device 100, other operation members and the like are included, but drawings and description thereof will be omitted in the description herein for the sake of convenience.

Herein, a change in a posture of the information processing device 100 will be described with reference to FIG. 1B. Rotation angles (in other words, a yaw angle, a pitch angle, and a roll angle) around three orthogonal axes can be changed in a state, for example, in which a user holds the information processing device 100 in his or her hand. For example, the posture of the information processing device 100 can be changed (change of the yaw angle) in the direction of the arrow 101 having the Y axis as a rotation axis (which is so-called horizontal rotation). In addition, the posture of the information processing device 100 can be changed (change of the pitch angle) in the direction of the arrow 102 having the X axis as a rotation axis (which is so-called vertical rotation). Further, for example, the posture of the information processing device 100 can be changed (change of the roll angle) in the direction of the arrow 103 having the Z axis as a rotation axis (which is so-called lens rotation).

Use Example of the Information Processing Device

Figure 2:
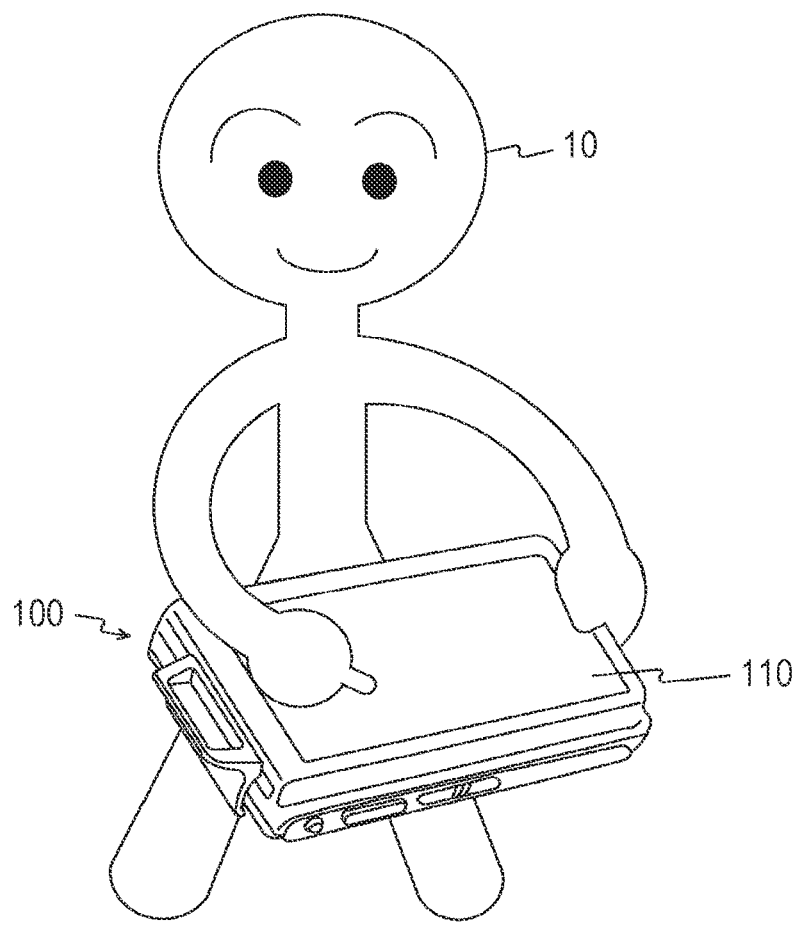
FIG. 2 shows an example of a posture of the information processing device when an operation input is performed using a touch panel of the information processing device.

FIG. 2 is a diagram showing an example of a posture when the information processing device 100 is used according to the first embodiment of the present technology.

FIG. 2 shows an example of a posture of the information processing device 100 when an operation input is performed using the touch panel 110 of the information processing device 100. As shown in FIG. 2, for example, a person 10 can perform an operation input on the touch panel 110 with his or her right hand in a state of holding the information processing device 100 with his or her left hand.

Transition Example of a Posture of the Information Processing Device

Figure 3A:
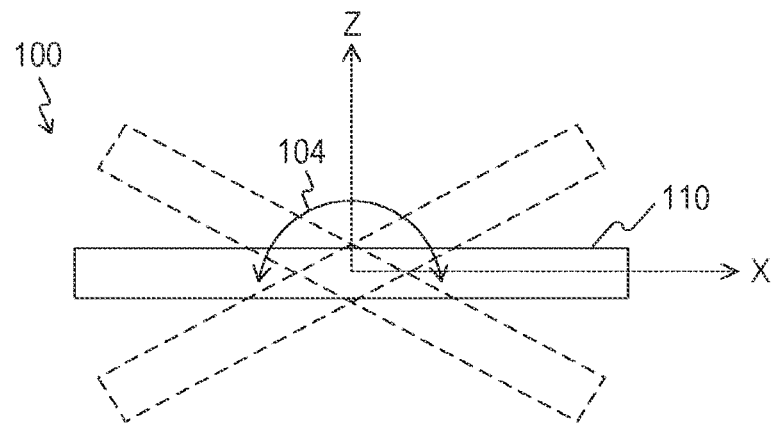
FIG. 3 is a diagram showing a transition example of postures when the information processing device is used according to the first embodiment of the present technology.
Figure 3B:
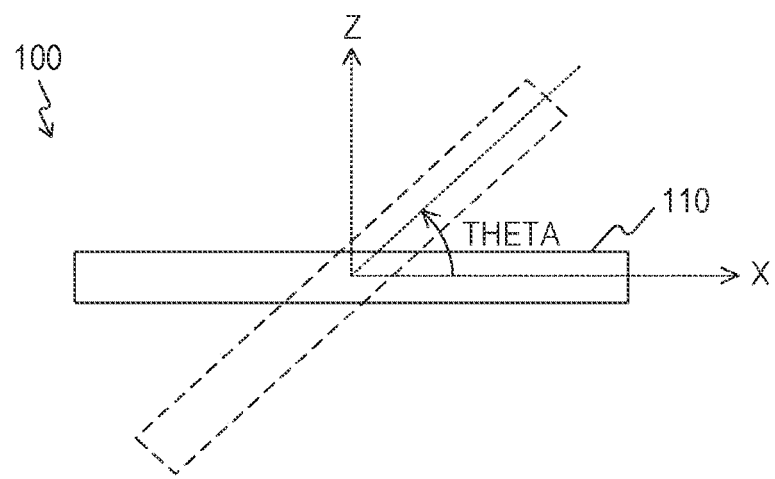
Figure 3C:
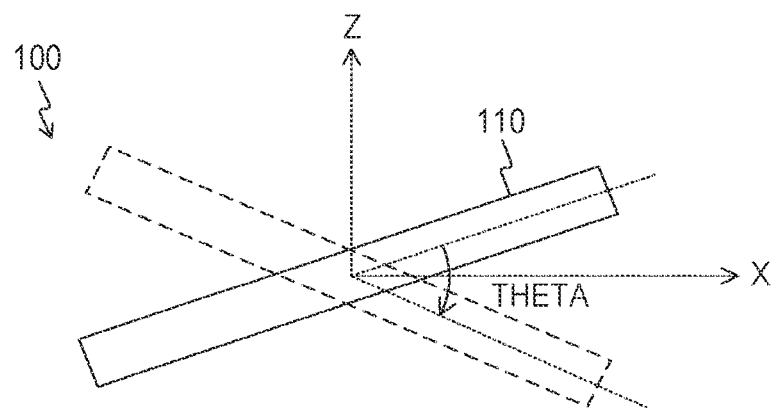

FIGS. 3A to 3C are diagrams showing transition examples of postures when the information processing device 100 is used according to the first embodiment of the present technology.

FIGS. 3A to 3C show a transition example of postures when the information processing device 100 is viewed from the bottom face side thereof (in other words, the face opposite to the face on which the operation members 121 to 124 are provided). Note that, in FIGS. 3A to 3C, the information processing device 100 in the state prior to rotation is indicated by solid lines, and the information processing device 100 in the state after rotation is indicated by dashed lines. In addition, FIGS. 3A and 3B show examples in which the postures of the information processing device 100 prior to rotation are parallel with the horizontal plane.

FIG. 3A shows a transition example when the posture of the information processing device 100 is changed by being rotated in the direction of the arrow 104 having the Y axis shown in FIG. 1B as a rotation axis.

FIG. 3B shows a transition example when the posture of the information processing device 100 is changed by being rotated by theta degrees in the direction opposite to the direction of the arrow 101 having the Y axis shown in FIG. 1B as a rotation axis.

FIG. 3C shows a transition example when the posture of the information processing device 100 is changed by being rotated by theta degrees in the direction of the arrow 101 having the Y axis shown in FIG. 1B as a rotation axis.

In the first embodiment of the present technology, an example in which an operation input on the touch panel 110 can be cancelled (including return) by changing a posture of the information processing device 100 in this manner is shown.

Internal Configuration Example of the Information Processing Device

Figure 4:
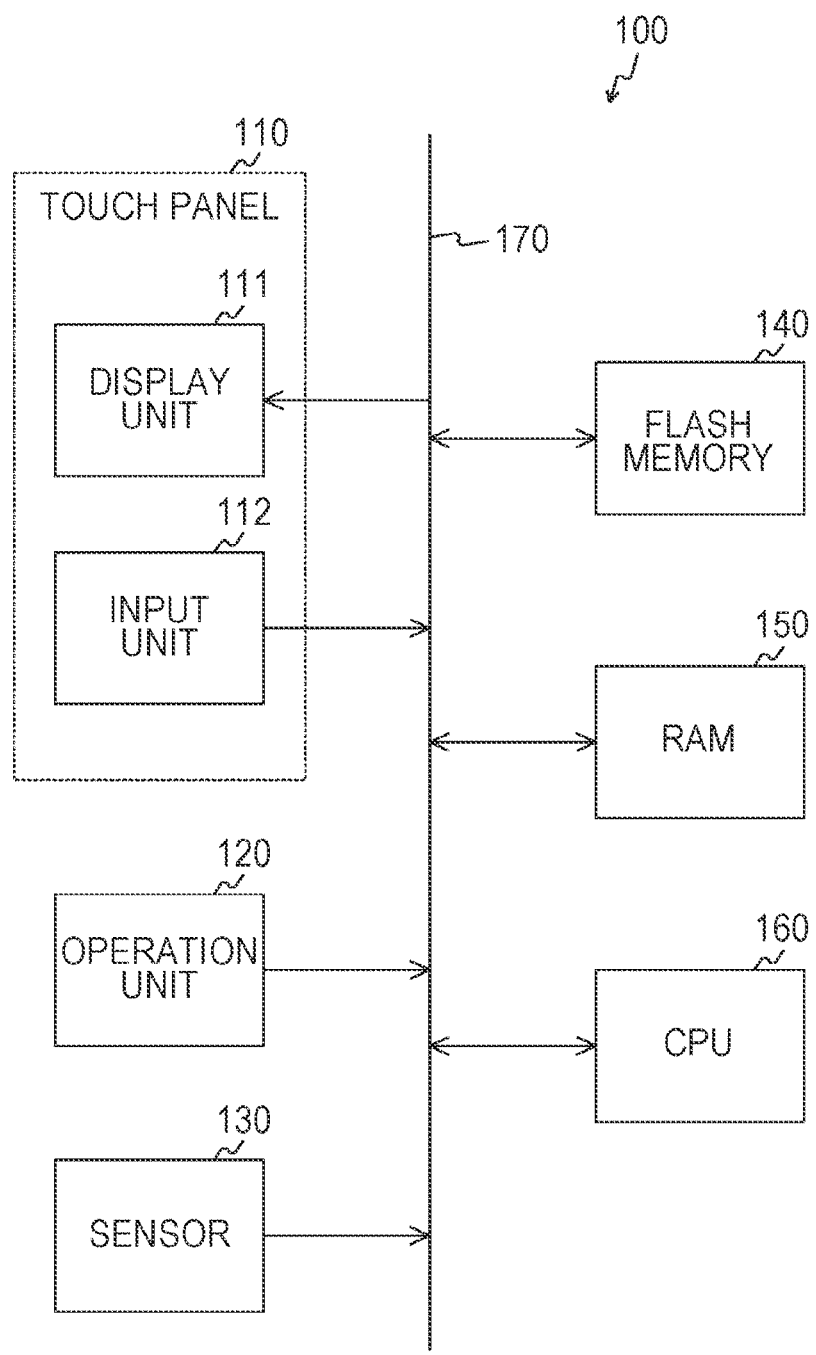
FIG. 4 is a block diagram showing an internal configuration example of the information processing device according to the first embodiment of the present technology.

FIG. 4 is a block diagram showing an internal configuration example of the information processing device 100 according to the first embodiment of the present technology.

The information processing device 100 includes the touch panel 110, the operation unit 120, a sensor 130, a flash memory 140, a RAM (Random Access Memory) 150, and the CPU (Central Processing Unit) 160. Note that each of the units are connected to one another via a bus 170 so as to be able to exchange various kinds of information.

The touch panel 110 is configured such that a display unit 111 and an input unit 112 are integrated, and a user can operate the information processing device 100 by touching an operation target, or the like, displayed on the display unit 111.

Figure 6:
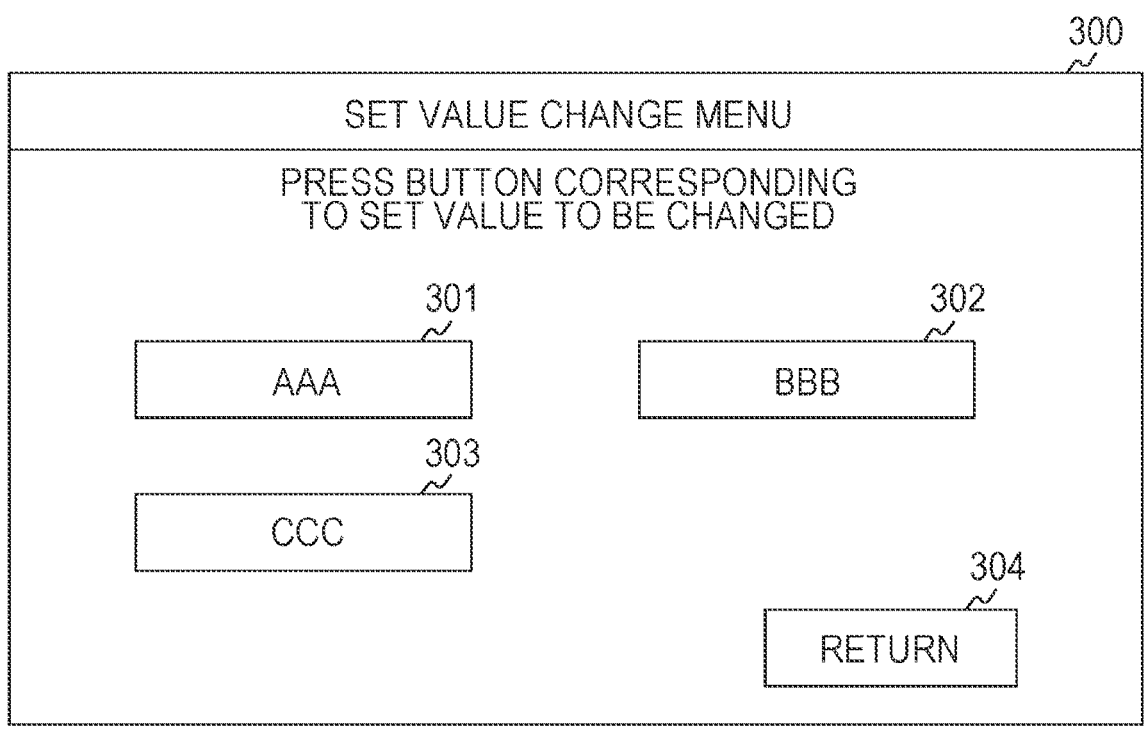
FIG. 6 is a diagram showing an example of a display screen displayed on a display unit according to the first embodiment of the present technology.

Herein, the operation target is, for example, an item such as an AAA button 301, a BBB button 302, a CCC button 303, and a return button 304 shown in FIG. 6 which are displayed on the touch panel 110, and is an operation button (GUI button) for performing an operation input, or the like.

As the input unit 112, for example, a touch panel of an electrostatic type (electrostatic capacitance type) which detects contact or proximity of an object having conductivity (for example, a finger of a person) based on a change in electrostatic capacitance can be used. In addition, as the display unit 111, for example, a display panel such as an LCD (Liquid Crystal Display), or an organic EL (Electro Luminescence) panel can be used. In addition, the touch panel 110 is configured such that, for example, a transparent touch panel is superimposed on a display face of a display panel.

In addition, the touch panel 110 causes various images to be displayed on the display unit 111 based on control of the CPU 160, and receives operation inputs from a user through the input unit 112 based on detection states of an object that is brought in proximity to or into contact with the display face of the display unit 111. In addition, the input unit 112 outputs control signals to the CPU 160 according to the received operation inputs.

The input unit 112 receives the operation inputs by an object that is brought in proximity to or into contact with the display face of the touch panel 110 (for example, a finger of a user) based on detection states of the object. For example, the input unit 112 includes a plurality of electrostatic sensors disposed in a grid shape. The electrostatic sensors are sensors which increase electrostatic capacitance when an object (object having conductivity (for example, a finger or a hand of a user)) is brought in proximity to or into contact with the display face of the touch panel 110. In addition, when electrostatic capacitance of the electrostatic sensors changes, the input unit 112 outputs information on the value of the electrostatic capacitance of the electrostatic sensors and the positions of the electrostatic sensors on the operation face of the input unit 112 (electrostatic sensor information) to the CPU 160. In other words, the input unit 112 detects coordinates of a contact position on the display face of the touch panel 110, and outputs the detected coordinates of the contact position to the CPU 160.

The display unit 111 is a display panel on which each image is displayed based on control of the CPU 160. Note that a display example of the display unit 111 will be shown in FIG. 6, and the like.

The operation unit 120 is an operation unit which receives operations performed by a user, and outputs control signals (operation signals) based on the received operation details to the CPU 160. Note that the operation unit 120 corresponds to the operation members 121 to 124 shown in FIG. 1.

The sensor 130 is a sensor which detects changes in a posture of the information processing device 100 by detecting an acceleration, a movement, an inclination, and the like of the information processing device 100. In addition, as the sensor 130, it is preferable to use a sensor which can detect rotation angles of three axes (for example, the X, Y, and Z axes shown in FIG. 1B) with respect to the information processing device 100. However, it may be configured to use a sensor which can detect a rotation angle of at least one or more axes. The examples of the sensor 130 that can be used are a gyro sensor, an acceleration sensor which can detect a direction of an acceleration, and an angular velocity sensor which can detect rotational movements.

The RAM 150 is a working memory of the CPU 160.

The flash memory 140 is a non-volatile memory in which various kinds of programs and data necessary for processes of the CPU 160 are stored.

The CPU 160 executes various kinds of processes based on user operations and programs recorded in the flash memory 140. In addition, the CPU 160 can acquire coordinates of contact positions on the display face of the touch panel 110.

Functional Configuration Example of the Information Processing Device

Figure 5:
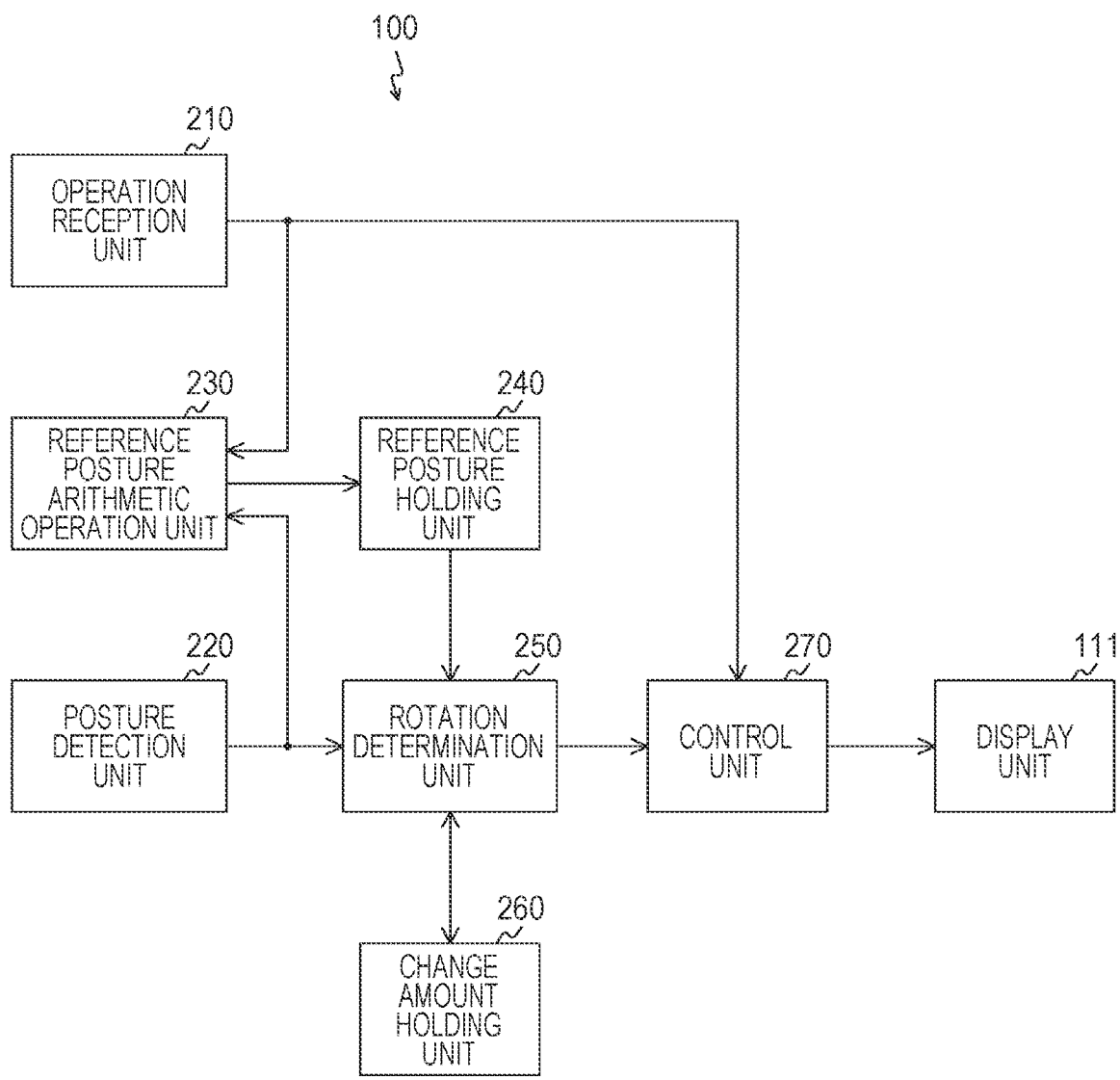
FIG. 5 is a block diagram showing a functional configuration example of the information processing device according to the first embodiment of the present technology.

FIG. 5 is a block diagram showing a functional configuration example of the information processing device 100 according to the first embodiment of the present technology.

The information processing device 100 includes the display unit 111, an operation reception unit 210, a posture detection unit 220, a reference posture arithmetic operation unit 230, a reference posture holding unit 240, a rotation determination unit 250, a change amount holding unit 260, and a control unit 270. Note that the display unit 111 corresponds to the display unit 111 shown in FIG. 4. In addition, the reference posture arithmetic operation unit 230, the rotation determination unit 250, and the control unit 270 correspond to the CPU 160 shown in FIG. 4. In addition, the reference posture holding unit 240 corresponds to the RAM 150 shown in FIG. 4.

The operation reception unit 210 is an operation reception unit which receives operations performed by a user, and outputs control signals (operation signals) according to the received operation details to the reference posture arithmetic operation unit 230 and the control unit 270. Note that the operation reception unit 210 corresponds to the input unit 112 and the operation unit 120 shown in FIG. 4.

The posture detection unit 220 detects changes in a posture of the information processing device 100 by detecting an acceleration, a movement, an inclination, and the like of the information processing device 100, and outputs posture information regarding the detected changes in the posture to the reference posture arithmetic operation unit 230 and the rotation determination unit 250. Note that the posture detection unit 220 corresponds to the sensor 130 shown in FIG. 4.

The reference posture arithmetic operation unit 230 computes a posture that serves as a reference for determining a change in a posture of the information processing device 100 (reference posture), and causes the reference posture holding unit 240 to hold information regarding the computed reference posture (reference posture information). For example, the reference posture arithmetic operation unit 230 computes the reference posture information at a time point at which a user operation is received by the operation reception unit 210 (time point at which the user operation is started), and then causes the reference posture holding unit 240 to hold the information. Note that the reference posture arithmetic operation unit 230 may be configured to compute the reference posture information at a time point before or after a user operation is received by the operation reception unit 210 (for example, in the range of 0.01 seconds before or after the time point). In other words, the reference posture arithmetic operation unit 230 decides a posture of the information processing device 100 as a reference posture based on the reception of the user operation by the operation reception unit 210.

In addition, when an acceleration sensor is used as the posture detection unit 220, for example, the reference posture arithmetic operation unit 230 acquires an inclination (angle) of the information processing device 100 from the acceleration sensor, and causes the reference posture holding unit 240 to hold the acquired inclination as a reference posture. For example, an inclination (angle) of the information processing device 100 from a position of an initial value (for example, a horizontal posture) is held by the reference posture holding unit 240 as a reference posture.

In addition, for example, when an angular velocity sensor is used as the posture detection unit 220, the reference posture arithmetic operation unit 230 calculates a posture of the information processing device 100 by setting an angular velocity acquired from the angular velocity sensor to be an integral value, and causes the reference posture holding unit 240 to hold the calculation result as a reference posture. The reference posture in this case corresponds to the initialization of the integral value of "0".

Note that the reference posture arithmetic operation unit 230 is realized by being executed by the CPU 160 based on a program recorded on the flash memory 140 shown in FIG. 4.

The reference posture holding unit 240 holds reference posture information computed by the reference posture arithmetic operation unit 230, and supplies the held reference posture information to the rotation determination unit 250.

The rotation determination unit 250 acquires a change amount from the reference posture and determines a change in a posture of the information processing device 100 based on posture information output from the posture detection unit 220 and reference posture information held by the reference posture holding unit 240. In addition, the rotation determination unit 250 causes the change amount holding unit 260 to hold the change amount so as to output the determination result to the control unit 270.

When an acceleration sensor is used as the posture detection unit 220, for example, the rotation determination unit 250 acquires an inclination (angle) of the information processing device 100 from the acceleration sensor to obtain a difference value from the reference posture held in the reference posture holding unit 240. In addition, the rotation determination unit 250 computes a change amount of the inclination (angle) of the information processing device 100 based on the difference value so as to cause the change amount holding unit 260 to hold the amount.

In addition, when an angular velocity sensor is used as the posture detection unit 220, for example, the rotation determination unit 250 computes a rotation angle from the reference posture held in the reference posture holding unit 240 by performing integration of an angular velocity acquired from the angular velocity sensor. Then, the rotation determination unit 250 causes the change amount holding unit 260 to hold the computed rotation angle.

Note that the present embodiment of the present technology shows an example in which, when a change amount from the reference posture is equal to or higher than 45 degrees with the threshold value of the rotation angle of 45 degrees, a process caused by a user operation is cancelled. However, a value other than 45 degrees (for example, in the range from 30 degrees to 60 degrees) may be used as the threshold value of the rotation angle.

Note that the rotation determination unit 250 is realized by being executed by the CPU 160 based on a program recorded on the flash memory 140 shown in FIG. 4.

The change amount holding unit 260 holds a changed amount (change amount from the reference posture) acquired by the rotation determination unit 250, and supplies the held change amount to the rotation determination unit 250.

The control unit 270 controls the execution of a process caused by a user operation. In addition, when a determination result that a posture of the information processing device 100 is changed by a predetermined amount from the reference posture is output from the rotation determination unit 250, the control unit 270 controls the process caused by the user operation to be cancelled. In this case, the posture of the information processing device decided based on the reception of the user operation is set as a reference posture. In addition, when a posture of the information processing device 100 is changed by a predetermined amount from the reference posture until a predetermined condition is satisfied, the control unit 270 controls a process caused by a user operation to be cancelled.

Herein, the control unit 270 can determine whether or not the posture has been changed by the predetermined amount from the reference posture based on a change in the posture of the information processing device 100 during the reception of the user operation. In addition, when a rotation amount of the information processing device 100 having a predetermined direction as a rotation axis in the information processing device 100 is changed by a predetermined amount, the control unit 270 can control a process caused by a user operation to be cancelled. When the user operation is confirmed, for example, the control unit 270 can determine that the predetermined condition is satisfied.

Herein, even when the information processing device 100 has been changed by a predetermined amount from the reference posture, and when the information processing device 100 is moved in a space, a process caused by a user operation may not be cancelled. In other words, only when the information processing device 100 is not moved in a space and when the information processing device 100 is changed by a predetermined amount from the reference posture, a process caused by a user operation can be cancelled. In other words, only when the center of rotation of the information processing device 100 is present within the information processing device 100, a process caused by a user operation is cancelled.

For example, by using a combination of an acceleration sensor and an angular velocity sensor as the posture detection unit 220 (sensor 130), rotation of the information processing device 100 and a movement of the information processing device 100 in a space can be detected. In other words, rotation of the information processing device 100 can be detected by the angular velocity sensor, and a movement of the information processing device 100 in a space can be detected by the acceleration sensor.

In this manner, even when a rotation amount of the information processing device 100 is changed by a predetermined amount, and when the information processing device 100 is moved in a space, the control unit 270 can control a process caused by a user operation not to be cancelled.

It is also considered a case, for example, in which operation is performed on the display face of the touch panel 110 while the information processing device 100 is changed in the horizontal direction in a state in which a user views the display face of the touch panel 110 downwardly. Even in this case, the information processing device 100 may be changed by a predetermined amount from the reference posture. Thus, when the information processing device 100 is moved in a space as above, a process caused by a user operation may not be cancelled.

Display Screen Example

FIG. 6 is a diagram showing an example of a display screen displayed on the display unit 111 according to the first embodiment of the present technology. In FIG. 6, an example (display screen 300) of a setting change menu screen (GUI menu screen) for changing the setting of various functions included in the information processing device 100 (for example, setting of photographing sizes when the information processing device 100 has a photographing function, and the like) is shown.

On the display screen 300, the AAA button 301, the BBB button 302, the CCC button 303, and the return button 304 are provided.

The AAA button 301, the BBB button 302, and the CCC button 303 are GUI (Graphical User Interface) buttons to be pressed when setting (for example, set values with regard to various functions) corresponding to each button are to be changed. Note that, in FIG. 6, the names of each of the buttons are simplified as AAA, BBB, and CCC for the sake of convenience in description. In addition, the AAA button 301, the BBB button 302, and the CCC button 303 are examples of operation targets.

The return button 304 is a button to be pressed to return to the display screen previously displayed.

Herein, a case in which, in a state in which a user touches an operation target (for example, the GUI button) with his or her finger, the touch operation is cancelled is considered in the information processing device having the touch panel 110. When the touch operation is cancelled in this manner, it is necessary for the finger to be moved out of the range of the operation target in a state in which the finger touching the target comes into contact therewith in the related art. However, in an operation of the touch panel 110, when the finger is moved while maintaining the touch, an operation error easily arises.

Thus, in the embodiment of the present technology, an example in which a cancellation operation of a user operation can be easily and reliably performed by improving operability when a user cancels a touch operation is shown. Specifically, when a posture is changed by a predetermined amount from the reference posture in a state in which an operation input of a user is not confirmed, the operation input is designed to be cancelled (or return to the state prior to the operation input).

Example of a Rotation Axis Used when Cancellation is Performed

FIG. 7 is a diagram showing an example of the relationship between a rotation axis used when a cancellation operation is performed and the information processing device 100 according to the first embodiment of the present technology. In this example, description will be provided on the assumption that the information processing device 100 is an imaging device or a mobile telephone.

As shown in FIG. 1B, there are a plurality of rotation axes (for example, the X axis, the Y axis, and the Z axis) in the information processing device 100. Thus, in the embodiment of the present technology, an example in which one or more axes out of the plurality of axes are used will be shown.

In addition, the rotation axes used when the cancellation operation is performed are selectively used depending on the modes and forms of the information processing device 100, as shown in FIG. 7. Accordingly, the cancellation operation can be more easily performed.

First, a case in which the information processing device 100 is an imaging device (for example, a digital still camera) is assumed. In this case, it is preferable to switch a rotation axis used when the cancellation operation is performed depending on a set mode (a photographing mode or a reproduction mode).

When the photographing mode is set, for example, operations of vertical photographing/horizontal photographing are frequently used, and thus, there are many cases in which rotation around the Z axis frequently occurs. For this reason, it is preferable to perform the cancellation operation having the X axis or the Y axis as a rotation axis. Note that it is also possible to employ one or more rotation axes so that rotation of the information processing device 100 using two axes which are the X axis and the Y axis is employed as a cancellation operation, or the like.

In addition, when the reproduction mode is set, an image of vertical photographing, for example, is vertically displayed during reproduction in general, and thus, vertical/horizontal rotation operations of the information processing device 100 are seldom performed in many cases. In addition, when the information processing device 100 is formed in a thin plate shape as shown in FIG. 1A, for example, it is assumed that rotation around the X axis and the Y axis occurs without awareness in many cases while a user operates the device. For this reason, it is preferable to perform the cancellation operation having the Z axis as a rotation axis.

Next, a case in which the information processing device 100 is a mobile telephone (including a smartphone) is assumed. With regard to a plate-like device such as a mobile telephone, it is assumed that rotation around the Z axis occurs least. For this reason, it is preferable to perform the cancellation operation having the Z axis as a rotation axis.

Note that the example of the relationship shown in FIG. 7 is an example of the rotation axes used when the cancellation operation is performed, and an axis other than in the example of the relationship shown in FIG. 7 may be configured to be a rotation axis used when the cancellation operation is performed. In addition, a rotation axis used when the cancellation operation is performed may be configured to be automatically switched during mode setting, and to be switched by a manual operation of a user. In other words, a rotation axis and a rotation angle (predetermined amount) for performing the cancellation operation are automatically or manually set in accordance with characteristics of the information processing device (for example, an imaging device, or a mobile telephone) and states of use (for example, the photographing mode, or the reproduction mode).

Note that, in the embodiment of the present technology, a case in which the Y axis is set to be a rotation axis with respect to the information processing device 100 will be described.

Cancellation Method of a User Operation

Figure 8A:
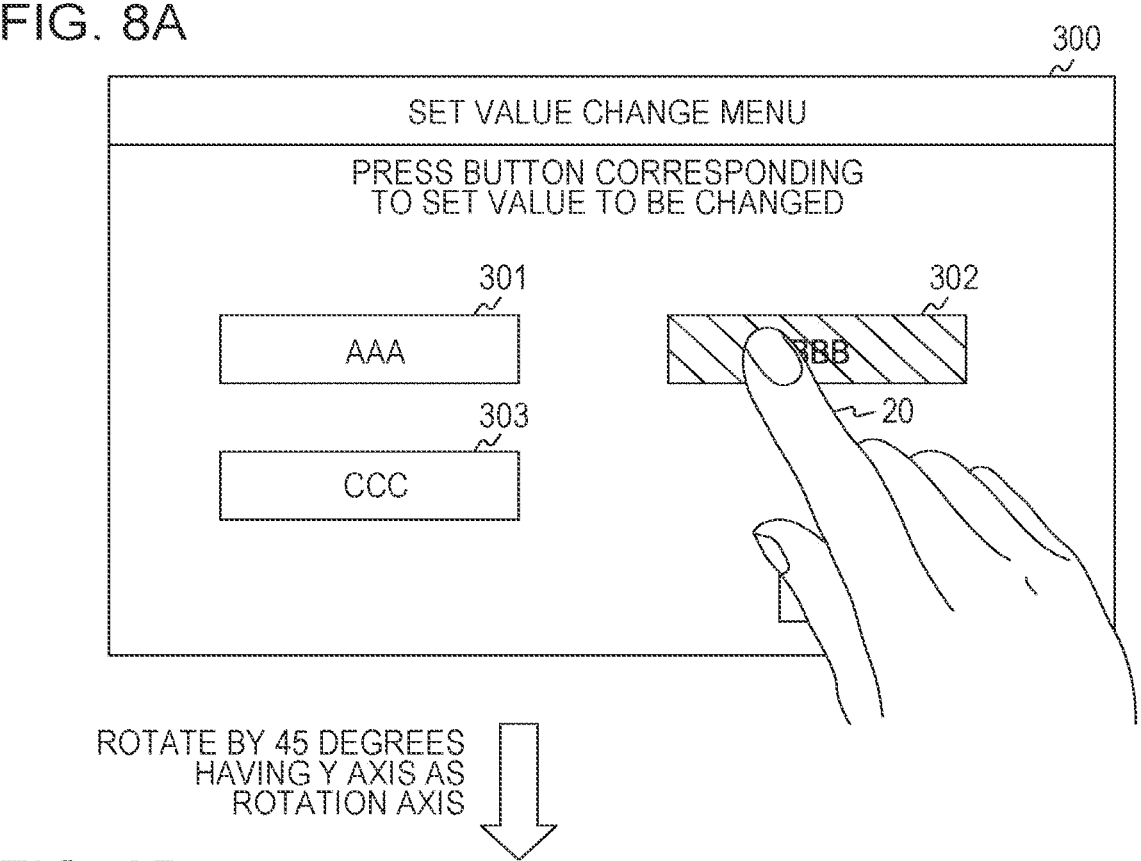
FIG. 8 is a diagram showing a transition example of an operation input using the touch panel and cancellation thereof according to the first embodiment of the present technology.
Figure 8B:
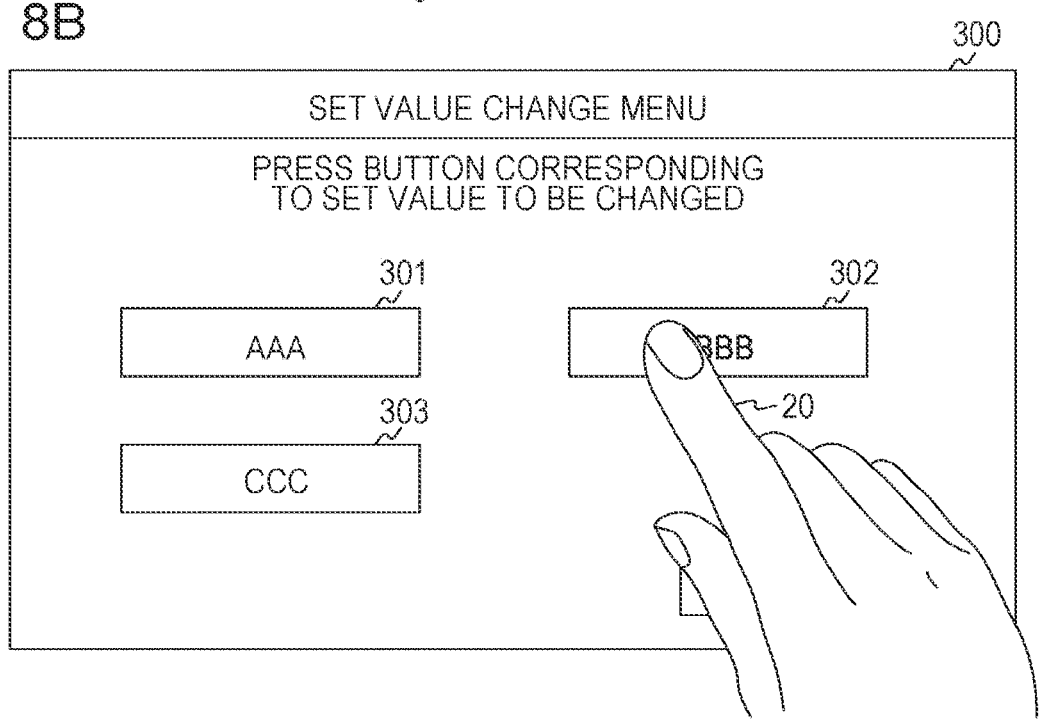

FIGS. 8A and 8B are diagrams showing transition examples of an operation input using the touch panel 110 and cancellation thereof according to the first embodiment of the present technology. Note that the display screen 300 shown in FIGS. 8A and 8B is the same as that in FIG. 6.

FIG. 8A shows a state in which a pressing operation (touch operation) for pressing the BBB button 302 on the display screen 300 is performed by the index finger 20 of a user. When the pressing operation for the BBB button 302 is performed, the color of the BBB button 302 is changed so that performance of the pressing operation can be recognized. Note that, in FIG. 8A, the change of color of the BBB button 302 is indicated by giving oblique lines inside the BBB button 302.

FIG. 8B shows a state in which the information processing device 100 is rotated by 45 degrees or more having the Y axis as a rotation axis after the pressing operation for the BBB button 302 is performed on the display screen 300 as shown in FIG. 8A. In this case, the index finger 20 of the user is in the state of being brought into contact with the BBB button 302.

Operation Example of the Information Processing Device

Figure 9:
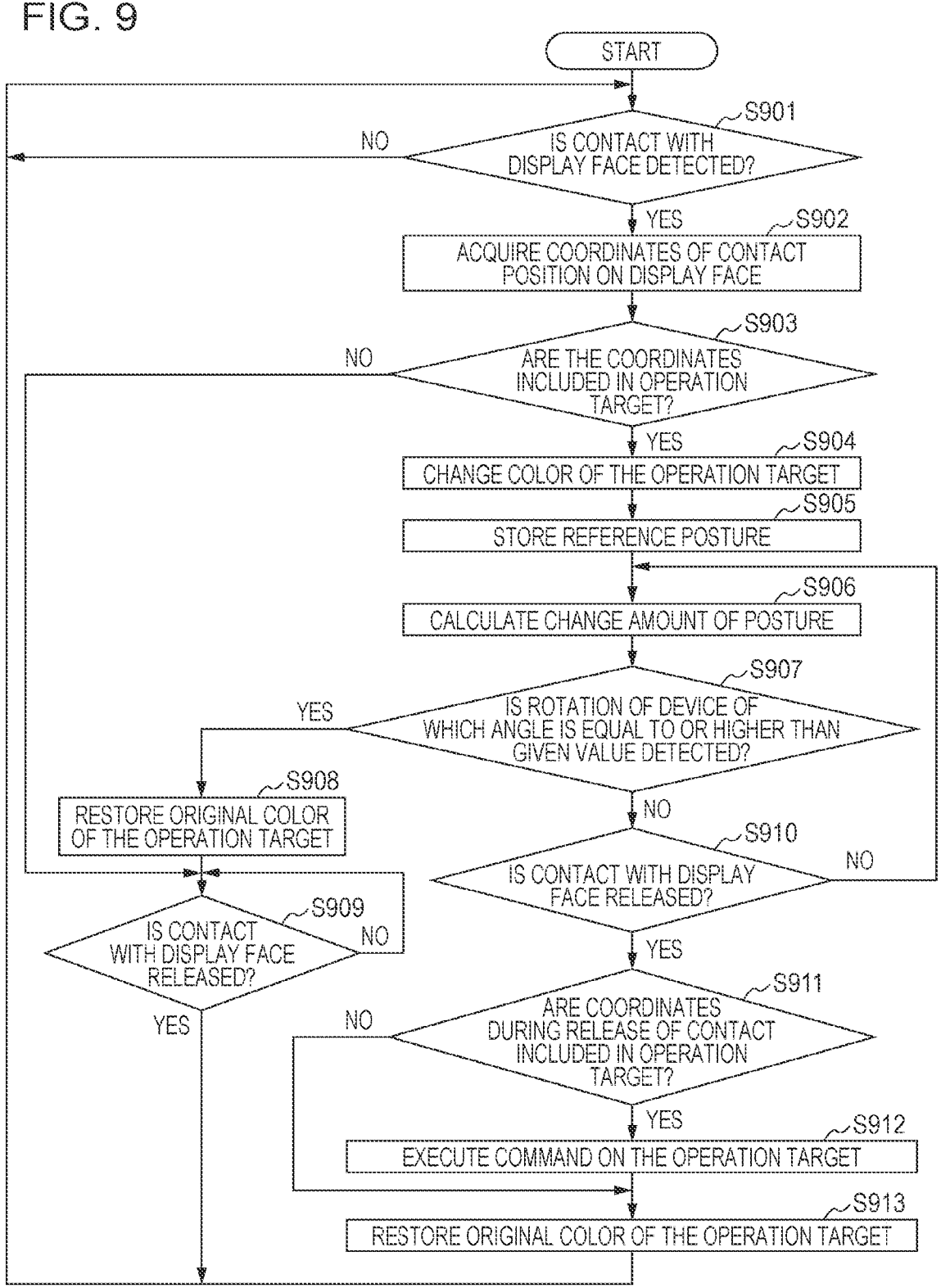
FIG. 9 is a flowchart showing an example of a procedure of an operation input process by the information processing device according to the first embodiment of the present technology.

FIG. 9 is a flowchart showing an example of a procedure of an operation input process by the information processing device 100 according to the first embodiment of the present technology. Note that, in this example, a case in which a user operation is cancelled when the information processing device 100 is rotated by a given angle or more having the Y axis as a rotation axis will be shown.

First, the control unit 270 monitors contact on the display face of the touch panel 110 and determines whether or not non-contact is changed to contact (Step S901). Information regarding the contact or non-contact is acquired from the operation reception unit 210 (input unit 112). When contact from non-contact is not detected (Step S901), monitoring of contact on the display face of the touch panel 110 is continued. On the other hand, when contact from non-contact is detected (Step S901), the control unit 270 acquires coordinates of the contact position on the display face of the touch panel 110 at the time when the contact is detected (Step S902). Information regarding the coordinates is acquired from the operation reception unit 210 (input unit 112).

Next, the control unit 270 determines whether or not the acquired coordinates of the contact position is within the region of the operation target (for example, the GUI button) displayed on the display unit 111 (Step S903). When the coordinates of the contact position is out of the region of the operation target (Step S903), the control unit 270 stands by until non-contact on the display face of the touch panel 110 is detected (Step S909). On the other hand, when the coordinates of the operation target is inside the region of the operation target (Step S903), the control unit 270 changes the color of the operation target displayed on the display unit 111 in order to notify the user that the operation target is being pressed (Step S904). For example, as shown in FIG. 8A, when a pressing operation for the BBB button 302 is performed, the color of the BBB button 302 is changed.

Next, the reference posture arithmetic operation unit 230 acquires the posture information when the contact on the display face of the touch panel 110 is detected from the posture detection unit 220, computes a reference posture, and causes the reference posture holding unit 240 to hold reference posture information regarding the reference posture (Step S905).

Next, the rotation determination unit 250 computes a change amount from the reference posture based on the posture information output from the posture detection unit 220 and the reference posture information held in the reference posture holding unit 240 (Step S906).

Next, the rotation determination unit 250 determines whether or not the information processing device 100 has been rotated by a given angle or more based on the computed change amount (Step S907). When the device has been rotated by the given angle or more (Step S907), the control unit 270 determines that a user operation (for example, button touching) has been cancelled, and returns the color of the operation target to the original color (Step S908). In other words, the color caused by pressing of the operation target is cancelled (Step S908). In addition, in this state, contact on the display face of the touch panel 110 is maintained, the control unit stands by until the contact is released (Step S909). On the other hand, when the device is not rotated by the given angle or more (Step S907), the control unit 270 determines whether or not the contact on the display face of the touch panel 110 has been released (Step S910). Note that, information regarding contact or non-contact on the display face of the touch panel 110 is acquired from the operation reception unit 210 (input unit 112).

When the contact on the display face of the touch panel 110 is not released (Step S910), the control unit 270 determines that the user operation is continuously performed, and returns to Step S906. Note that Steps S901 to S909 are an example of the control procedure.

In this manner, it is determined that the user operation is continuously performed from the time when contact switched from non-contact on the display face of the touch panel 110 is detected (Step S901) to the time when the rotation by a given angle or more is detected (Step S907). In addition, it is determined that the user operation is continuously performed from the time when contact switched from non-contact on the display face of the touch panel 110 is detected (Step S901) to the time when the release of the contact on the display face of the touch panel 110 is detected (Step S910).

When the contact on the display face of the touch panel 110 has been released (Step S910), the control unit 270 determines that the user operation has been confirmed and ascertains the coordinates on which the release of the contact has occurred (Step S911). In other words, the control unit 270 determines whether or not the coordinates when the contact on the display face of the touch panel 110 is released are within the operation target (Step S911).

When the coordinates of the contact release are within the operation target (Step S911), the control unit 270 executes a process assigned for the operation target (Step S912), and returns the color of the operation target to the original color (Step S913). On the other hand, when the coordinates of the contact release are out of the operation target (Step S911), the control unit 270 returns the color of the operation target to the original color without executing the process assigned for the operation target (Step S913). In other words, the color caused by pressing of the operation target is cancelled (Step S913). Note that each process of Steps S911 and S913 is a process performed when touching out of the operation target is released. In addition, various processes assigned for the operation target are executed by releasing the contact on the display face of the touch panel 110 within the operation target.

In this manner, in the first embodiment of the present technology, when a touch operation is cancelled in the state in which the operation target (for example, the BBB button 302 shown in FIG. 8) is touched by a finger of the user, the information processing device 100 is rotated by a given angle or more having the Y axis as a rotation axis. Accordingly, when a touch operation is cancelled, for example, it is not necessary to move the finger, which is touching the operation target so as to come into contact therewith, out of the range of the operation target. In other words, after the operation target on the display face of the touch panel 110 is touched, the pressing state of the operation target can be released based on a change amount of rotation of the information processing device 100. In this case, the process assigned for the operation target is not executed even when contact on the touch panel 110 is released in that state. For this reason, an operation error can be prevented. In other words, operability when the user cancels a touch operation can be improved, and a user operation can be reliably cancelled only with a simple operation which is rotation of a device.

In addition, by using the rotation of a device in determining whether or not cancellation is performed, it is possible to distinguish shaking that arises during operations of the device from a cancellation request from a user. For this reason, wrong execution of a cancellation operation can be prevented.

2. Second Embodiment

In the first embodiment of the present technology, the example in which a pressing operation (contact operation) when an operation target is pressed is cancelled with a rotation operation of the information processing device is shown. Herein, it is considered that the first embodiment of the present technology can also be applied to a user operation in which display details are changed in the state in which contact on the display face is maintained (which is a so-called drag operation).

Therefore, in a second embodiment of the present technology, an example in which, when display details are changed using a drag operation, the drag operation (contact operation) is cancelled with a rotation operation of the information processing device will be shown. Note that a configuration of the information processing device according to the second embodiment of the present technology is substantially the same as the examples shown in FIGS. 4, 5, and the like. For this reason, the same reference numerals are given to common portions of the first embodiment of the present technology, and thus, description regarding some of the portions will be omitted.

Transition Example of a Display Screen

Figure 10A:
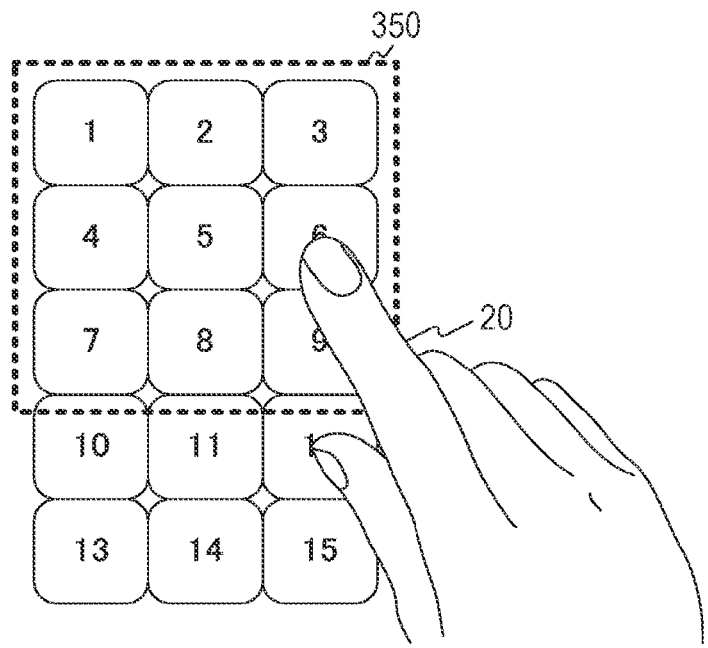
FIG. 10 is a diagram showing a transition example of a display screen on a display face of the touch panel caused by a user operation (drag operation) according to a second embodiment of the present technology.
Figure 10B:
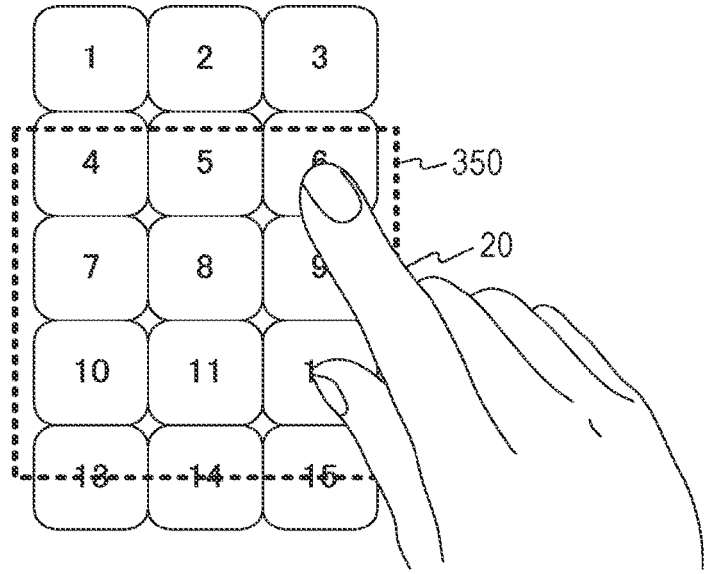
Figure 11:
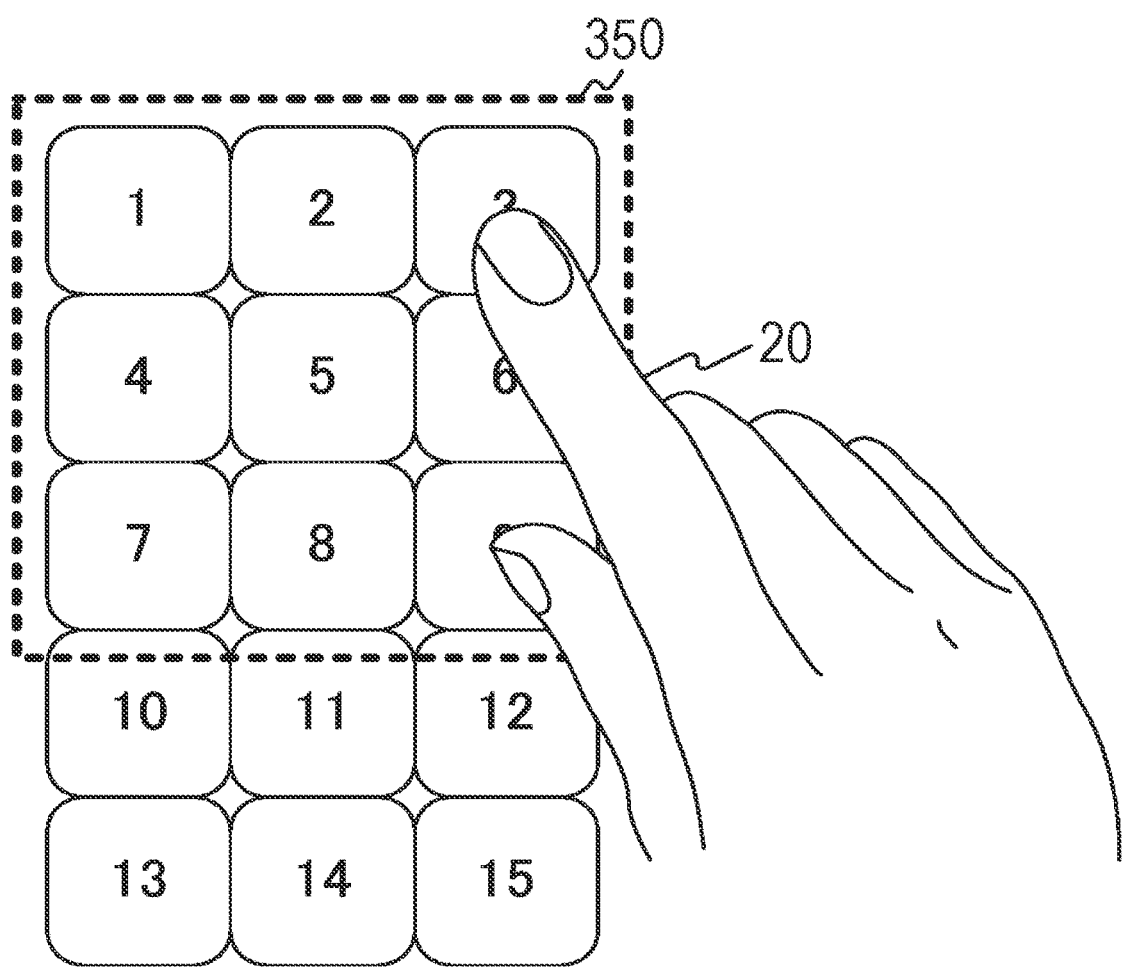
FIG. 11 is a diagram showing the transition example of the display screen on the display face of the touch panel caused by the user operation (drag operation) according to the second embodiment of the present technology.

FIGS. 10A, 10B and 11 are diagrams showing a transition example of a display screen on the display face of the touch panel 110 caused by a user operation (drag operation) according to the second embodiment of the present technology. Note that the drag operation means a user operation in which coordinates of a contact position is moved in a state in which contact on the display face of the touch panel 110 is detected and then the contact is maintained. In addition, in the example of FIGS. 10A, 10B and 11, an example in which item transfer is performed with a user operation in a state in which a menu screen is displayed on the touch panel 110.

FIGS. 10A, 10B and 11 show an example of the menu screen displayed on the touch panel 110. Note that FIGS. 10A, 10B and 11 show all items of the menu screen by simplifying in substantial rectangular shapes (substantial rectangular shapes to which numbers 1 to 15 are given therein). In addition, among all of the items of the menu screen, the region to be displayed (display target region 350) is indicated by being surrounded by a rectangular dashed line.

Herein, in general, when various kinds of menu screens are displayed, and menu items do not fall within one screen on the display unit 111, some of all items are displayed. In addition, by performing item transfer with the drag operation on the display face of the touch panel 110, desired items can be displayed.

When item transfer is to be performed on the menu screen (for items included in the display target region 350) displayed on the touch panel 110, for example, a user brings his or her index finger 20 in contact with the display face of the touch panel 110 as shown in FIG. 10A. Then, the finger is moved to a desired direction (for example, the upper direction in FIG. 10) maintaining the contact as shown in FIG. 10B. In this manner, item transfer of the menu display is performed following the coordinates of the contact position (for example, the position of the substantial rectangular shape to which the number 6 is give therein) on the display face of the touch panel 110 by the user performing a drag operation on the menu screen. Accordingly, the user can display the desired items.

Herein, a case in which the original items are to be displayed after a drag operation is performed on the menu screen is assumed. In this case, since it is necessary to perform a drag operation of the same amount as the drag operation previously performed, a flick operation, and the like in the direction opposite to that of the drag operation previously performed, there is concern that such operations are cumbersome. Thus, in the second embodiment of the present technology, a drag operation performed on the menu screen is cancelled using a rotation operation of the information processing device 100.

For example, the information processing device 100 is rotated by 45 degrees or more having the Y axis as a rotation axis after a drag operation is performed, as shown in FIG. 10B. By rotating the information processing device 100 by 45 degrees or more in this manner, the drag operation previously performed is cancelled so as to return the device to the original state. This display example is shown in FIG. 11.

FIG. 11 shows the display example after the information processing device 100 is rotated by 45 degrees or more having the Y axis as a rotation axis after the drag operation is performed. As shown in FIG. 11, the display target region 350 returns to the state before the drag operation (in other words, the state shown in FIG. 10A). However, the coordinates of the contact position on the display face of the index finger 20 of the user is the same as the coordinates after the drag operation is performed (in other words, the coordinates shown in FIG. 10B).

Operation Example of the Information Processing Device

FIG. 12 is a flowchart showing an example of a procedure of an operation input process by the information processing device 100 according to the second embodiment of the present technology. Note that, in this example, an example in which a drag operation is cancelled when the information processing device 100 is rotated by a given angle or more having the Y axis as a rotation axis.

First, the control unit 270 monitors contact on the display face of the touch panel 110 and determines whether or not the state has been changed to contact from non-contact (Step S921). Information regarding the contact or non-contact is acquired from the operation reception unit 210 (input unit 112). When contact switched from non-contact is not detected (Step S921), monitoring of contact on the display face of the touch panel 110 is continued. On the other hand, when contact switched from non-contact is detected (Step S921), the control unit 270 determines the start of a drag operation (Step S922). For example, having the coordinates on which the contact switched from non-contact (coordinates of the contact position) on the display face of the touch panel 110 as a base point, when the coordinates of the contact position is moved to a given amount or more, the control unit 270 can determine that a drag operation has started (Step S922). Information regarding the coordinates is acquired from the operation reception unit 210 (input unit 112). In addition, when a drag operation has not started (Step S922), the process returns to Step S921.

When a drag operation has started (Step S922), the control unit 270 stores the display state of the display unit 111 at the time of starting the drag operation (Step S923). Since the state returns to the display state at the time of starting the drag operation when, for example, the drag operation is cancelled, the display state of the display unit 111 at the time of starting the drag operation is stored. With regard to the menu screen, for example, the display of items is stored.

Next, the reference posture arithmetic operation unit 230 acquires posture information when the drag operation is started from the posture detection unit 220 to compute a reference posture, and causes the reference posture holding unit 240 to hold reference posture information regarding this reference posture (Step S924). Next, the control unit 270 acquires the coordinates of the contact position on the display face of the touch panel 110 during the drag operation (Step S925). Information regarding the coordinates is acquired from the operation reception unit 210 (input unit 112).

Next, the control unit 270 updates display details in accordance with the coordinates of the contact position during the drag operation (Step S926). As shown in FIGS. 10A and 10B, for example, the item transfer on the menu screen is performed according to the movement amount of the coordinates of the contact position on the touch panel 110 (Step S926).

Next, the control unit 270 determines whether or not the contact on the display face of the touch panel 110 has been maintained (Step S927). Note that information regarding the contact or non-contact on the display face of the touch panel 110 is acquired from the operation reception unit 210 (input unit 112). In addition, when the contact is released (Step S927), the drag operation is determined to be finished, and the process returns to Step S921. In this manner, when the contact on the display face of the touch panel 110 is released during the drag operation, menu items are updated following the coordinates of the contact position, and therefore, upgraded menu items are displayed.

In addition, when the contact on the display face of the touch panel 110 has been maintained (Step S927), the control unit 270 determines that the drag operation is being continued. Then, the rotation determination unit 250 computes a change amount from the reference posture based on the posture information output from the posture detection unit 220 and the reference posture information held in the reference posture holding unit 240 (Step S928).

Next, the rotation determination unit 250 determines whether or not the information processing device 100 has been rotated by a given angle or more based on the computed change amount (Step S929). When the device is rotated by the given angle or more (Step S929), the control unit 270 determines that the drag operation has been cancelled, and returns display details to the display state at the time of starting dragging (Step S930). In other words, the display details (display state of the display unit 111) stored at the time of starting the drag operation are displayed. In this manner, the drag operation is cancelled by returning to the display state before the drag operation is started. In addition, the drag operation is cancelled in this state, but since the contact on the display face of the touch panel 110 is being maintained, the control unit stands by until the contact is released (Step S931). On the other hand, when the device has not been rotated by the given angle or more (Step S929), the control unit 270 determines that the drag operation is being continued and the process returns to Step S925.

In this manner, the drag operation is determined to be continued from the time when the start of the drag operation on the display face of the touch panel 110 is detected (Step S921) to the time when rotation by the given angle or more is detected (Step S929). In addition, the drag operation is determined to be continued from the time when the contact switched from non-contact on the display face of the touch panel 110 is detected (Step S921) to the time when release of the contact on the display face of the touch panel 110 is detected (Step S927).

In this manner, when a posture of the information processing device 100 is changed from the reference posture by a predetermined amount until a predetermined condition is satisfied (until the drag operation ends), the control unit 270 cancels a process caused by the user operation (drag operation). Then, the control unit 270 controls so as to return to the display screen displayed at the time of receiving the user operation (drag operation).

In this manner, in the second embodiment of the present technology, the information processing device 100 is rotated by a given angle or more having the Y axis as a rotation axis when a drag operation is performed and then the drag operation is cancelled (the case in which the device returns to the state before the start of the drag operation). Accordingly, when the drag operation is cancelled, for example, since the drag operation can be reliably cancelled only with a simple operation which is the rotation of the device, an operation error can be prevented. In other words, the operability when a user cancels a drag operation can be improved, and a cancellation operation of a user operation can be easily and reliably performed.

3. Third Embodiment

In the second embodiment of the present technology, the example in which a drag operation (contact operation) is cancelled with a rotation operation of the information processing device has been shown. Herein, it is considered that the first embodiment of the present technology can be applied also to a user operation in which a finger mildly sweeps the display face in a state of being brought into contact therewith (which is a so-called flick operation).

Thus, in a third embodiment of the present technology, a case in which, when display details are to be changed with a flick operation, the flick operation is cancelled with a rotation operation of the information processing device will be shown. Note that a configuration of the information processing device in the third embodiment of the present technology is substantially the same as that in the examples shown in FIGS. 4, 5, and the like. For this reason, the same reference numerals are given to common portions to the first embodiment of the present technology, and thus, description regarding some of the portions will be omitted.

Transition Example of the Display Screen

FIGS. 13A, 13B, 14A and 14B are diagrams showing a transition example of the display screen on the display face of the touch panel 110 by a user operation (flick operation) according to the third embodiment of the present technology. Note that a flick operation means an operation in which a finger mildly sweeps the display face of the touch panel 110 in an aimed direction and by an aimed movement amount in a state being brought into contact therewith. In other words, a flick operation means a user operation in which contact on the display face of the touch panel 110 is detected, then the coordinates of the contact position are moved in the state of maintaining the contact, and then the contact on the touch panel 110 is released. In addition, in the example shown in FIGS. 13A, 13B, 14A and 14B, an example in which item transfer is performed with a user operation (flick operation) in a state in which a menu screen is displayed on the touch panel 110.

FIGS. 13A, 13B, 14A and 14B show an example of the menu screen displayed on the touch panel 110. Note that FIGS. 13A, 13B, 14A and 14B show all items of the menu screen by simplifying in substantial rectangular shapes (substantial rectangular shapes to which numbers 1 to 15 are given therein) in the same manner as in FIGS. 10A, 10B and 11. In addition, among all of the items of the menu screen, the region to be displayed (display target region 360) is indicated by being surrounded by a rectangular dashed line.

Herein, in general, when various kinds of menu screens are displayed, and menu items do not fall within one screen on the display unit 111, some of all items are displayed. In addition, by performing item transfer with the flick operation on the display face of the touch panel 110, desired items can be displayed.

Figure 13A:
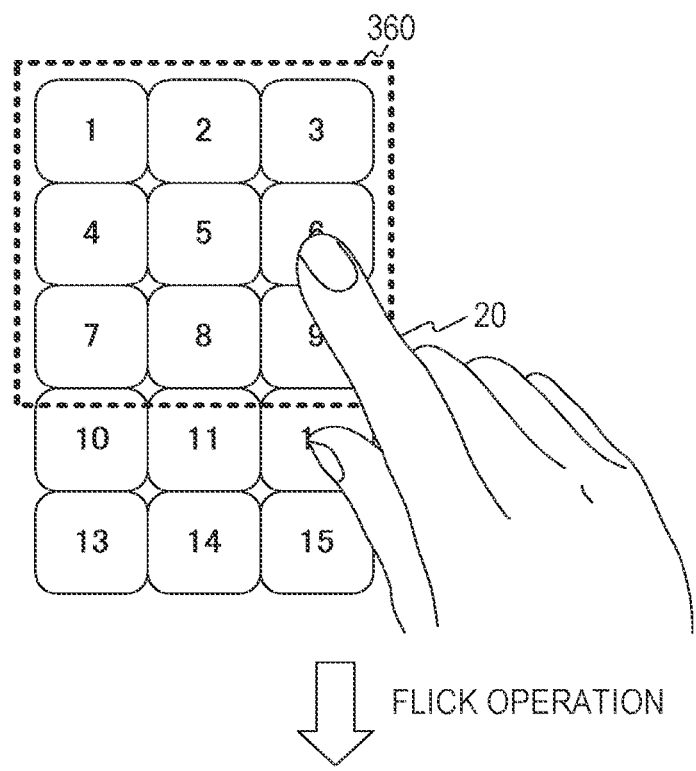
FIG. 13 is a diagram showing a transition example of the display screen on the display face of the touch panel by a user operation (flick operation) according to a third embodiment of the present technology.
Figure 13B:
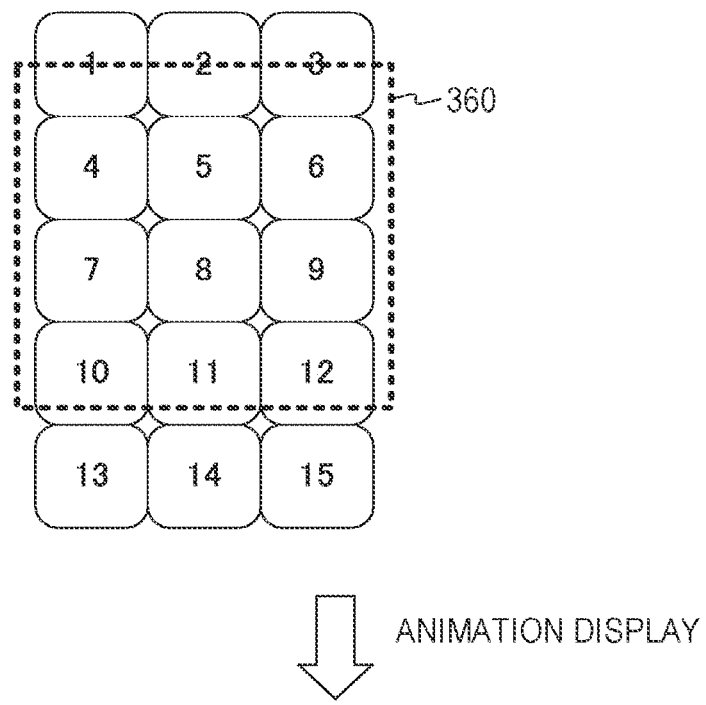
Figure 14A:
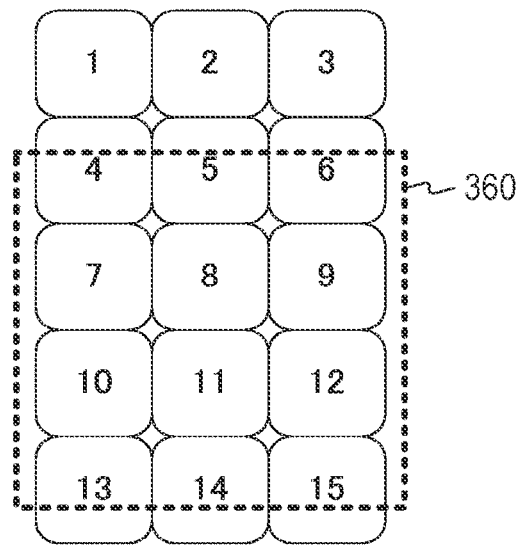
FIG. 14 is a diagram showing the transition example of the display screen on the display face of the touch panel by the user operation (flick operation) according to the third embodiment of the present technology.

When item transfer is performed for the menu screen (items included in the display target region 360) displayed on the touch panel 110, for example, a user brings his or her index finger 20 in contact with the display face of the touch panel 110 as shown in FIG. 13A. Then, by mildly sweeping the finger in an aimed direction and by an aimed movement amount in a state in which the finger is brought in contact with the display face of the touch panel 110, the items can be moved in the direction and by the movement amount, as shown in FIGS. 13B and 14A. In this manner, a scroll animation process of menu items is executed according to a change speed of coordinates of a contact position in the flick operation by the user performing flick operation on the menu screen. Note that, after the user performs the item transfer in the flick operation, the animation process is executed for a given time in general.

In this manner, in the flick operation, the speed at which the user moves his or her finger and the transfer amount of the menu items are in a corresponding relationship. An example of this corresponding relationship is shown in FIG. 15.

Example of the Relationship Between a Flicking Speed and a Transfer Amount

FIG. 15 is a diagram showing an example of the relationship between a transfer amount and a flicking speed in a flick operation performed in the information processing device 100 according to a third embodiment of the present technology.

Herein, a flicking speed (V) means the speed of a finger sweeping the display face of the touch panel 110 in the state of being brought into contact therewith. In addition, a transfer amount means the number of items scrolled on the display face of the touch panel 110. In addition, in the example of the relationship shown in FIG. 15, V0 to V2 are set to be values that satisfy the relationship of V0<V1<V2.

When, for example, the flicking speed (V) is less than V0, item transfer is not performed. In addition, when the flicking speed (V) is equal to or higher than V0 and less than V1, item transfer in the amount of 5 items is performed. In addition, when the flicking speed (V) is equal to or higher than V1 and less than V2, item transfer in the amount of 10 items is performed. In addition, when the flicking speed (V) is equal to or higher than V2, item transfer in the amount of 15 items is performed.

Example of Cancelling a Flick Operation

Herein, a case, in which the original items are displayed after a flick operation is performed on the menu screen, is assumed. In this case, since it is necessary to perform a drag operation, a flick operation of the same amount as the flick operation previously performed, and the like in the direction opposite to that of the flick operation previously performed, there is concern that such operations are cumbersome. Thus, in the third embodiment of the present technology, a flick operation performed on the menu screen is cancelled using a rotation operation of the information processing device.

For example, the information processing device 100 is rotated by 45 degrees or more having the Y axis as a rotation axis in the state in which an animation process is performed based on a flick operation, as shown in FIG. 14A. By rotating the information processing device 100 by 45 degrees or more in this manner, the flick operation previously performed is cancelled so as to return the device to the original state. This display example is shown in FIG. 14B.

Figure 14B:
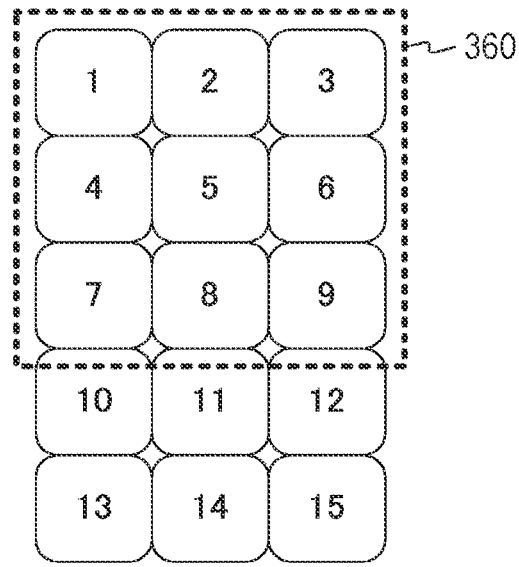

FIG. 14B shows a display example after the information processing device 100 is rotated by 45 degrees or more having the Y axis as a rotation axis in the state in which the animation process is performed based on the flick operation. As shown in FIG. 14B, the display target region 360 returns to the state before the flick operation (in other words, the state shown in FIG. 13A).

Operation Example of the Information Processing Device

FIG. 16 is a flowchart showing an example of a procedure of an operation input process by the information processing device 100 according to the third embodiment of the present technology. Note that, in this example, an example in which a flick operation is cancelled when the information processing device 100 is rotated by a given angle or more having the Y axis as a rotation axis will be shown.

First, the control unit 270 monitors contact on the display face of the touch panel 110, and determines whether or not the state has been changed to contact from non-contact (Step S941). Information regarding contact or non-contact is acquired from the operation reception unit 210 (input unit 112). When contact switched from non-contact is not detected (Step S941), monitoring contact on the display face of the touch panel 110 is continued. On the other hand, when contact switched from non-contact is detected (Step S941), the control unit 270 determines start of a flick operation (Step S942).

For example, the control unit 270 determines the start of the flick operation (Step S942) using contact start coordinates and contact release coordinates on the display face of the touch panel 110 and the contact time from the contact start time to the contact release time. The control unit 270 computes the flicking speed (V) based on, for example, the contact start coordinates, the contact release coordinates, and the contact time, and then determines whether or not the flicking speed (V) is equal to or higher than a given value (V0). In addition, when the flicking speed (V) is equal to or higher than the given value (V0), the control unit 270 determines that the flick operation has started (Step S942). Note that information regarding the coordinates is acquired from the operation reception unit 210 (input unit 112). In addition, the contact time from the contact start time to the contact release time is measured by the control unit 270.

In addition, when the flick operation has not started (Step S942), the process returns to Step S941. In addition, when the flick operation has started (Step S942), the control unit 270 stores the display state of the display unit 111 at the time of starting the flick operation (Step S943). In order to return to the display state at the time of starting the flick operation when the flick operation is cancelled, for example, the display state of the display unit 111 at the time of starting the flick operation is stored. With regard to the menu screen, for example, the display of items is stored.

Next, the reference posture arithmetic operation unit 230 acquires posture information when the flick operation has started from the posture detection unit 220 to compute a reference posture, and causes the reference posture holding unit 240 to hold reference posture information regarding this reference posture (Step S944). Next, the control unit 270 decides a transfer amount of display items based on the flicking speed (Step S945). For example, the control unit 270 computes the flicking speed (V) based on the contact start coordinates, the contact release coordinates, and the contact time, and decides the transfer amount of the display items based on the flicking speed (V) and the relationship between V0 to V2 shown in FIG. 15 (Step S945).

Next, the control unit 270 executes an animation process for transferring the display items in the decided transfer amount (Step S946). For example, a scroll animation process for the display items in which displays are updated in order in a given cycle is executed. Note that, as the scroll animation process, a method of an inertial animation, or the like can be used as an example. However, if an animation can be executed for a given time, other animation processes may be performed.

Next, the control unit 270 determines whether or not the animation process has ended (Step S947). For example, the end of the animation process can be determined based on whether or not display items are transferred in the decided amount of the item transfer. When the animation process has ended (Step S947), a series of processes of the flick operation ends, and the control unit returns to monitoring of the flick operation. On the other hand, when the animation process has not ended (Step S947), the rotation determination unit 250 computes a change amount from the reference posture (Step S948). In other words, the change amount from the reference posture is computed based on the posture information output from the posture detection unit 220, and the reference posture information held in the reference posture holding unit 240 (Step S948).

Next, the rotation determination unit 250 determines whether or not the information processing device 100 has been rotated by a given angle or more based on the computed change amount (Step S949). When the device has been rotated by the given amount or more (Step S949), the control unit 270 determines that the flick operation has been cancelled, and causes the display details to return to the display state at the time of starting the flick operation (Step S951). In other words, the display details stored at the time of starting the flick operation (display state of the display unit 111) are displayed. In this manner, by returning to the display state before the start of the flick operation, the flick operation is cancelled.

In addition, when the device has not been rotated by the given angle or more (Step S949), the control unit 270 determines that the flick operation is being continued, and determines whether or not the flick operation is consecutively performed (Step S950). In other words, the flick operation is determined to be continuing until the animation ends from the time when the start of the flick operation on the display face of the touch panel 110 is detected (Step S941) to the time when rotation by the given angle or more is detected (Step S949). In addition, consecutive flick operations mean that the flick operation is performed again in the state in which the animation process continues. In addition, the determination of the start of flicking in the consecutive flick operation is the same as the determination process in Step S942.

When the consecutive flick operations are performed (Step S950), the process returns to Step S943. On the other hand, when the consecutive flick operations are not performed (Step S950), the process returns to Step S946.

In this manner, when a posture of the information processing device 100 is changed from the reference posture in a predetermined amount until a predetermined condition is satisfied (until the flick process ends), the control unit 270 cancels a process caused by a user operation (flick operation). Then, the control unit 270 controls so as to return to the display screen displayed at the time of receiving the user operation (flick operation).

Note that, in the third embodiment of the present technology, the example in which returning to the display state at the time of starting a flick operation has been shown as an example of a cancellation operation of the flick operation. However, it may be configured that only the animation process ends at, for example, the time when cancellation is detected without returning to the display state before the start of the flick operation (in other words, the animation process is stopped). In addition, when cancellation is detected within a predetermined time after the animation process ends, for example, it may be configured to return to the display state before the start of the flick operation.

In this manner, in the third embodiment of the present technology, when a flick operation is started and then cancelled in a state in which item transfer for the menu screen is performed, the information processing device 100 is rotated by a given angle or more having the Y axis as a rotation axis. Note that, when the flick operation is cancelled, a case in which returning to the state before the start of the flick operation is also included.

Accordingly, when the flick operation is cancelled, for example, the flick operation can be reliably cancelled only using a simple operation which is the rotation of the device for the flick operation, and an operation error can be prevented. In other words, the operability when a user cancelled the flick operation can be improved, and the cancellation operation for the user operation can be easily and reliably performed.

4. Fourth Embodiment

In the first to third embodiments of the present technology, the example in which a contact operation on the display face is cancelled using a rotation operation of the information processing device has been shown. Herein, there is a touch panel which can detect proximity of an object (for example, a finger) to the display face.

Thus, in a fourth embodiment of the present technology, an example in which a process caused by proximity to the display face is cancelled using a rotation operation of the information processing device will be shown. Note that a configuration of the information processing device according to the fourth embodiment of the present technology is substantially the same as the example shown in FIGS. 4, 5, and the like. For this reason, the same reference numerals are given to common portions to the first embodiment of the present technology, and thus, description regarding some of the portions will be omitted.

Transition Example of a Display Screen

FIGS. 17A, 17B, 18A and 18B are diagrams showing a transition example of the display screen on the display face of the touch panel 110 by a user operation (proximity operation) according to the fourth embodiment of the present technology.

In addition, FIGS. 17A, 17B, 18A and 18B show an example in which a live view image is displayed on the touch panel 110 and an operation target (for example, an REC button 401) is displayed on the live view image in an overlapping manner. Herein, the live view image is an image generated in an imaging operation of an imaging unit (not shown) and displayed on the touch panel 110 so that a user can check the image that is undergoing the imaging operation.

In addition, when proximity of an object (for example, a finger) on the display face of the touch panel 110 is detected, the control unit 270 controls a predetermined operation target to be moved to the position at which the proximity is detected (the position on the display face). Note that FIGS. 17A, 17B, 18A and 18B show an example in which the REC button 401 is moved so as to be close to the position at which the proximity is detected in the state before an imaging operation of a moving image is started (for example, refer to Japanese Unexamined Patent Application Publication No. 2011-060209). In addition, as a touch panel that can detect proximity of an object (for example, a finger), for example, a touch panel of an electrostatic capacitance type that can detect proximity of an object based on a change in electrostatic capacitance can be used.

Figure 17A:
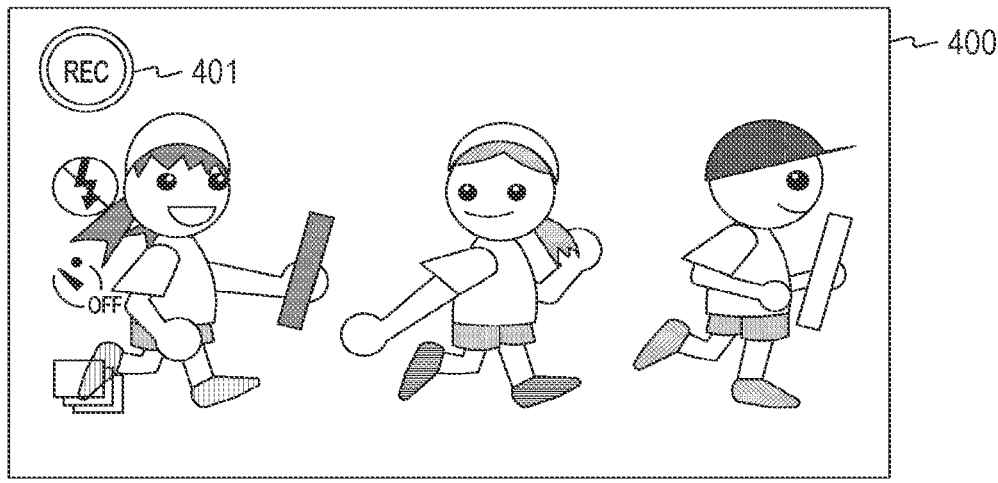
FIG. 17 is a diagram showing a transition example of the display screen on the display face of the touch panel by a user operation (proximity operation) according to a fourth embodiment of the present technology.

FIG. 17A shows a display example of a live view image in the touch panel 110. In this state, when a user brings his or her index finger 20 in proximity to the touch panel 110, the REC button 401 moves so as to be close to the position at which the proximity is detected. This display example is shown in FIG. 17B.

Figure 17B:
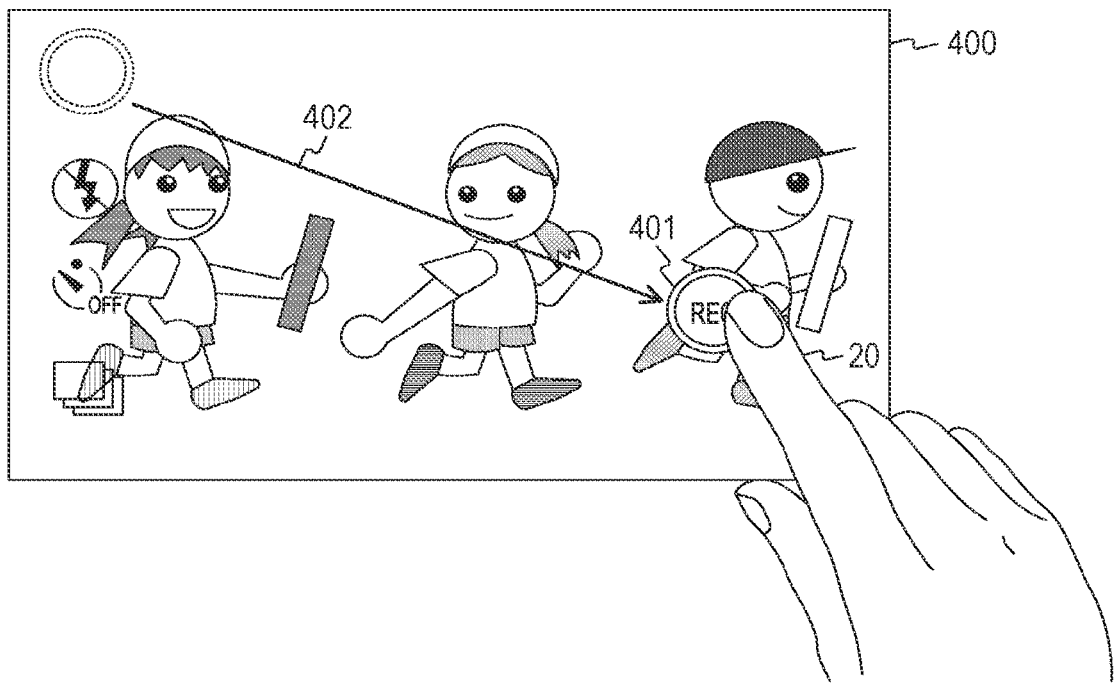

FIG. 17B shows a transition example of the REC button 401 when the user brings his or her index finger 20 in proximity to the touch panel 110. As shown by the arrow 402, for example, the REC button 401 moves so as to be close to the position to which the index finger 20 of the user gets close on the touch panel 110. When the index finger 20 of the user comes into contact with the touch panel 110 in this state, the color of the REC button 401 is changed. In addition, when the index finger 20 of the user is separated from the touch panel 110 after the contact, a pressing operation of the REC button 401 is confirmed and then an imaging operation is started. Note that, when the index finger 20 of the user is separated without being brought into contact with the touch panel 110, the REC button 401 returns to the original position.

Herein, a case in which, after the REC button 401 moves to the proximity position of the index finger 20 of the user, the user desires to return the REC button 401 to the original position without separating index finger 20 of the user therefrom is also assumed. The cancellation can be easily performed using a rotation operation of the information processing device 100 also in this case. This cancellation example is shown in FIG. 18.

Figure 18A:
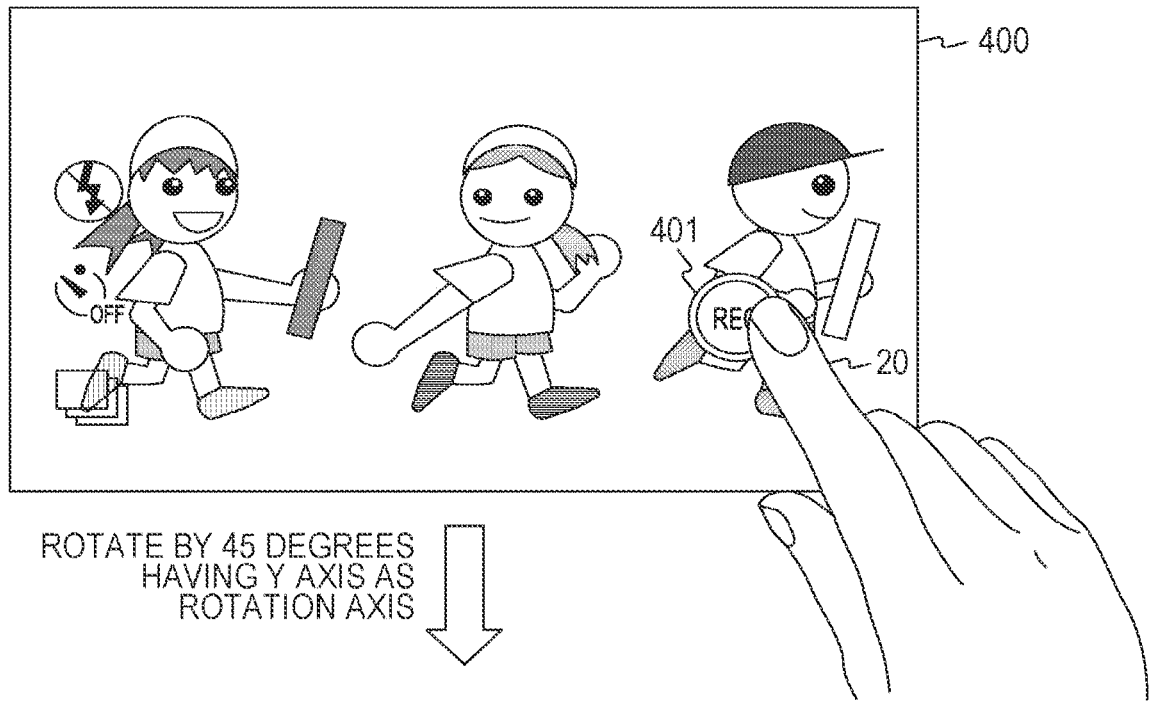
FIG. 18 is a diagram showing a transition example of the display screen on the display face of the touch panel by a user operation (proximity operation) according to the fourth embodiment of the present technology.

For example, as shown in FIG. 18A, in the state in which the index finger 20 of the user is in proximity to the touch panel 110, the information processing device 100 is rotated by 45 degrees or more having the Y axis as a rotation axis. In this manner, by rotating the information processing device 100 by 45 degrees or more, the REC button 401 that has moved in the vicinity of the proximity position can return to the original position. This display example is shown in FIG. 18B.

Figure 18B:
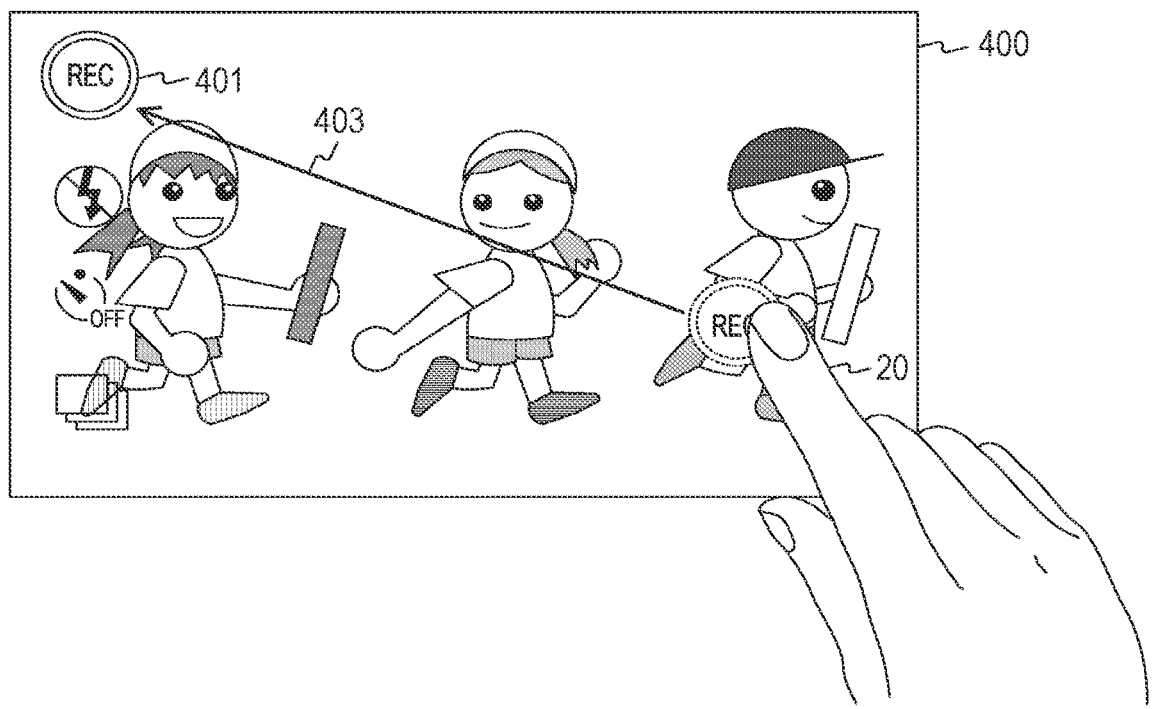

FIG. 18B shows the display example after the information processing device 100 has been rotated by 45 degrees or more having the Y axis as a rotation axis in the state in which the index finger 20 of the user is in proximity to the touch panel 110. As indicated by the arrow 403, the REC button 401 returns to the original position.

Operation Example of the Information Processing Device

Figure 19:
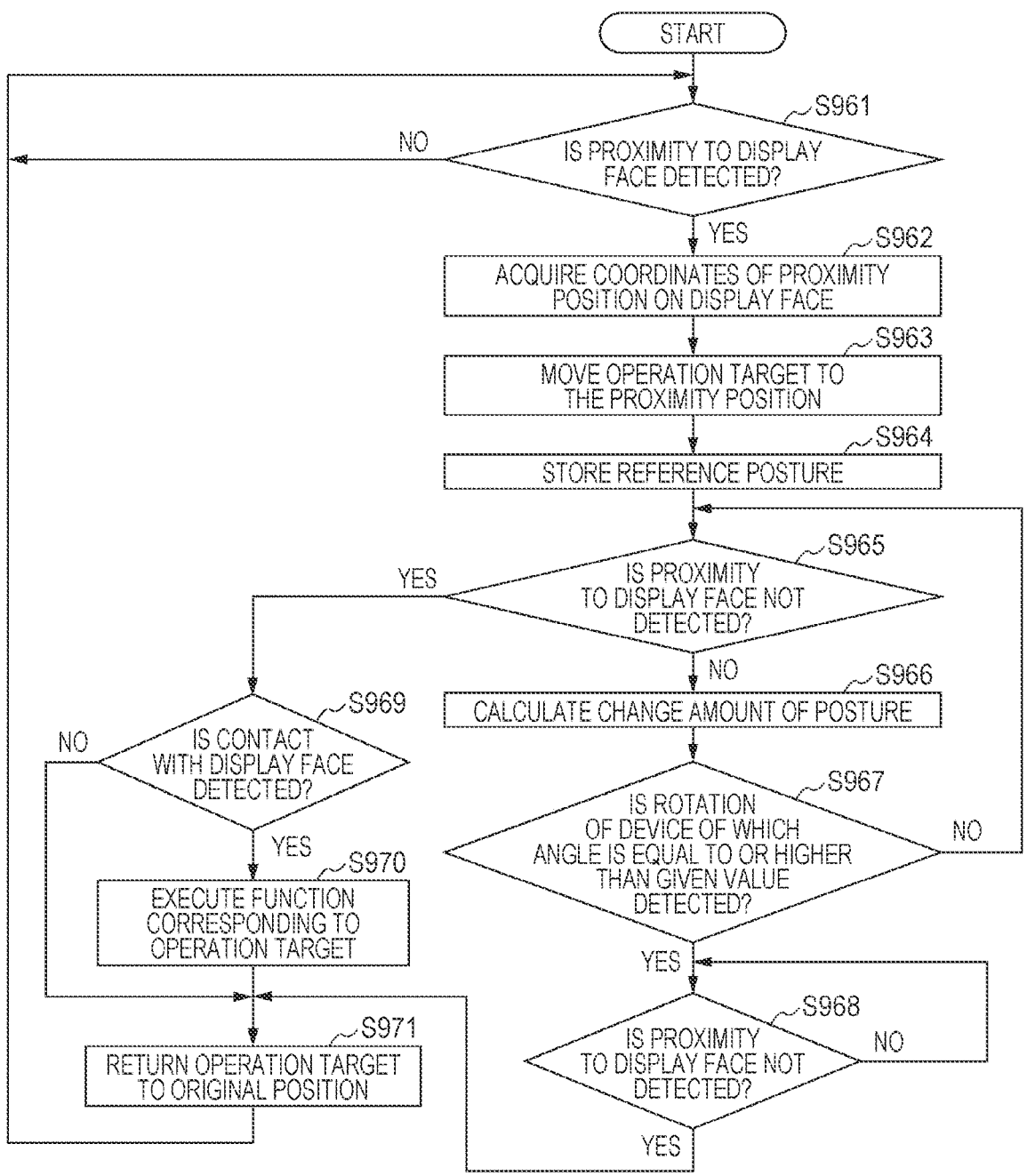
FIG. 19 is a flowchart showing an example of a procedure of an operation input process by the information processing device according to the fourth embodiment of the present technology.

FIG. 19 is a flowchart showing an example of a procedure of an operation input process by the information processing device 100 according to the fourth embodiment of the present technology. Note that, in this example, an example in which a proximity operation is cancelled when the information processing device 100 has been rotated by a given angle or more having the Y axis as a rotation axis.

First, the control unit 270 monitors proximity to the display face of the touch panel 110, and then determines whether or not proximity has been detected (Step S961). Information regarding the proximity is acquired from the operation reception unit 210 (input unit 112). When proximity has not been detected (Step S961), monitoring of proximity to the display face of the touch panel 110 is continued. On the other hand, when proximity has been detected (Step S961), the control unit 270 acquires the position at which the proximity is detected (coordinates of the proximity position on the display face) (Step S962), and a predetermined operation target is moved to the position (Step S963). In this manner, by moving the predetermined operation target, a user easily presses the operation target.

Next, the reference posture arithmetic operation unit 230 acquires posture information at the time when the proximity is detected from the posture detection unit 220 to compute a reference posture, and causes the reference posture holding unit 240 to hold reference posture information regarding the reference posture (Step S964). Next, the control unit 270 monitors proximity to the display face of the touch panel 110, and then determines whether or not proximity has been detected (Step S965). When proximity has not been detected (Step S965), the control unit 270 determines whether or not contact with the display face of the touch panel 110 has been detected (Step S969). Then, when contact with the display face of the touch panel 110 has not been detected (Step S969), the process proceeds to Step S971.

In addition, when contact with the display face of the touch panel 110 has been detected (Step S969), the control unit 270 executes a function assigned for a predetermined operation target (an operation target that is moved to the proximity position) (Step S970). For example, as shown in FIGS. 17A, 17B, 18A and 18B, when the predetermined operation target is the REC button 401, an imaging operation is started. Next, the control unit 270 returns the predetermined operation target to the original position on the display face (Step S971).

In addition, when proximity has been detected (Step S965), the rotation determination unit 250 computes a change amount from the reference posture based on the posture information output from the posture detection unit 220 and the reference posture information held in the reference posture holding unit 240 (Step S966).

Next, the rotation determination unit 250 determines whether or not the information processing device 100 has been rotated by a given angle or more based on the computed change amount (Step S967). When the device has been rotated by the given angle or more (Step S967), the control unit 270 determines that the user has cancelled the proximity operation, stands by until proximity is not detected (Step S968), and then returns the predetermined operation target to the original position on the display face (Step S971). On the other hand, when the device has not been rotated by the given angle or more (Step S967), the control unit 270 determines that the proximity operation is being continued, and then determines whether or not proximity has been detected (Step S965).

In this manner, in the fourth embodiment of the present technology, an operation target (for example, the REC button 401) approaches the proximity position by a proximity operation on the touch panel 110. In this case, the display position of the operation target can return to the original position by a user rotating the information processing device 100. Accordingly, when such a proximity operation is cancelled, for example, since only a simple operation which is rotation of the device can reliably cancel the proximity operation, an operation error can be prevented. In other words, operability when a user cancels a proximity operation can be improved, and the proximity operation of a user operation can be easily and reliably performed.

5. Fifth Embodiment

In the first to fourth embodiments of the present technology, the example in which a contact operation or a proximity operation on the display face is cancelled by a rotation operation of the information processing device has been shown. Herein, a case, in which after a contact operation or a proximity operation on the display face is confirmed, the operation is desired to be cancelled is also assumed.

Therefore, in a fifth embodiment of the present technology, a case, in which after a contact operation or a proximity operation on the display face is confirmed, the operation is cancelled by a rotation operation of the information processing device will be shown. Note that a configuration of the information processing device according to the fifth embodiment of the present technology is substantially the same as the example shown in FIGS. 4, 5, and the like. For this reason, the same reference numerals are given to common portions to the first embodiment of the present technology, and thus, description regarding some of the portions will be omitted.

Operation Example of the Information Processing Device

Figure 20:
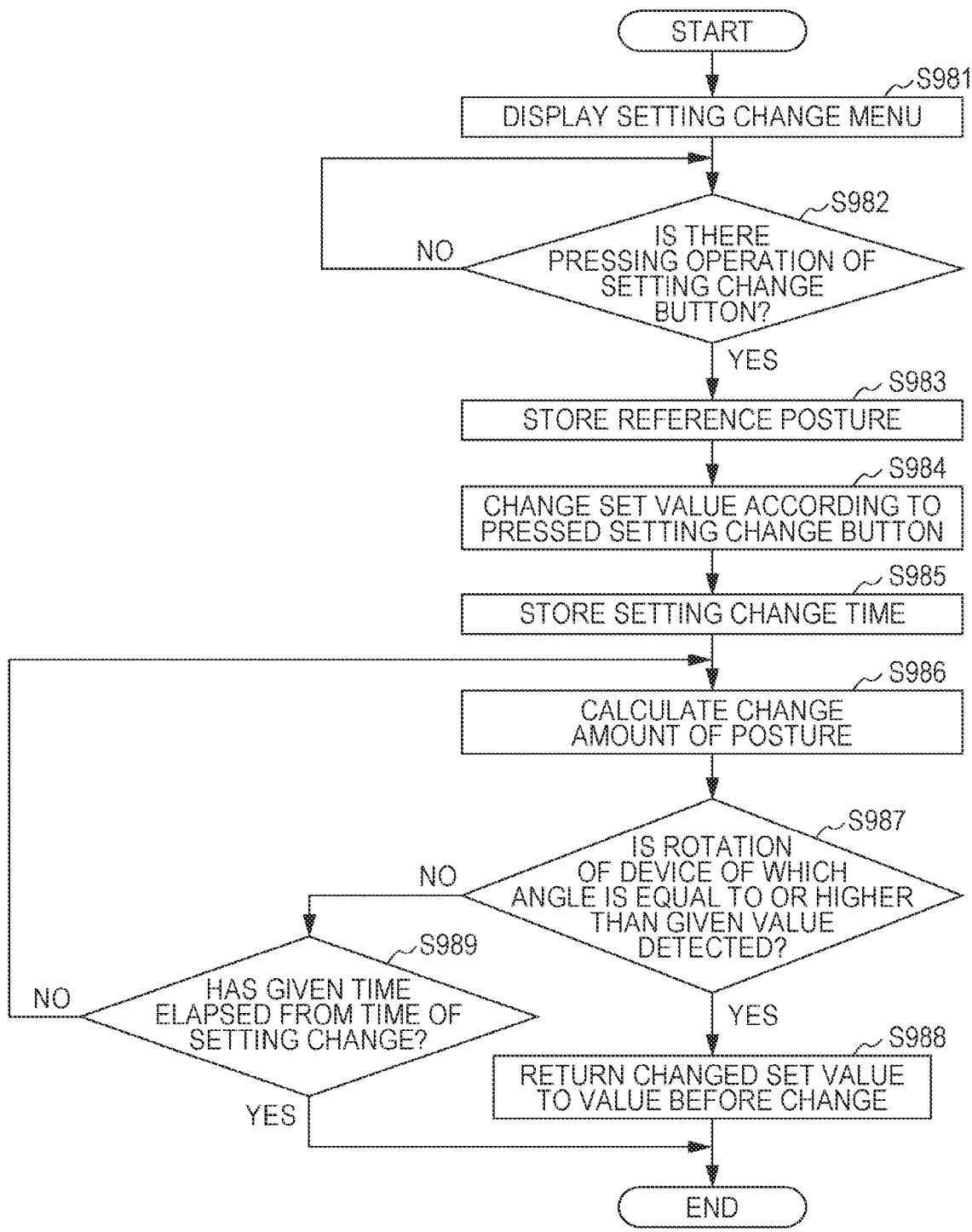
FIG. 20 is a flowchart showing an example of a procedure of an operation input process by the information processing device according to a fifth embodiment of the present technology.

FIG. 20 is a flowchart showing an example of a procedure of an operation input process by the information processing device 100 according to the fifth embodiment of the present technology. Note that, in this example, an example in which a confirmed operation is cancelled when the information processing device 100 has been rotated by a given angle or more having the Y axis as a rotation axis will be shown. In other words, an example in which, when a predetermined posture change is detected within a given time from an input confirmation of a user operation, the information processing device return to the state before the input.

First, the control unit 270 causes a setting change menu screen to be displayed on the touch panel 110 (Step S981). For example, the display screen 300 shown in FIG. 6 is displayed (Step S981). Next, the control unit 270 monitors contact with the display face of the touch panel 110, and then determines whether or not a pressing operation for a setting change button has been performed (Step S982). Information regarding this contact is acquired from the operation reception unit 210 (input unit 112). When the pressing operation for the setting change button has not be performed (Step S982), monitoring of contact with the display face of the touch panel 110 is continued. On the other hand, when the pressing operation of the setting change button is performed (Step S982), the reference posture arithmetic operation unit 230 posture information at the time when the pressing operation is detected from the posture detection unit 220 to compute a reference posture. Then, the reference posture arithmetic operation unit 230 causes the reference posture holding unit 240 to hold reference posture information regarding the reference posture (Step S983).

Next, the control unit 270 changes a set value corresponding to the setting change button for which the pressing operation is performed (Step S984). Next, the control unit 270 stores the time at which the set value is changed (Step S985). Next, the rotation determination unit 250 computes a change amount from the reference posture based on the posture information output from the posture detection unit 220 and the reference posture information held in the reference posture holding unit 240 (Step S986).

Next, the rotation determination unit 250 determines whether or not the information processing device 100 has been rotated by a given angle or more based on the computed change amount (Step S987). When the device has been rotated by the given angle or more (Step S987), the control unit 270 determines that the user has cancelled the pressing operation and returns the set value changed by the pressing operation to the original (Step S988). On the other hand, when the device has not been rotated by the given angle or more (Step S987), the control unit 270 computes the elapsed time from the time at which the set value is changed, and then determines whether or not a given time (for example, 1 minute) has elapsed from the time of setting change (Step S989).

Then, when the given time has elapsed from the time of set change (Step S989), the operation of an operation input process ends. On the other hand, when the given time has not elapsed from the time of set change (Step S989), the process returns to Step S986.

In this manner, when a posture of the information processing device 100 is changed from the reference posture by a predetermined amount for a predetermined elapsed time after a user operation is confirmed, the control unit 270 controls so as to cancel a process caused by the user operation.

Herein, in general, when a set value of the information processing device is turned back to the original value after its change, it is necessary to open the menu screen again so as to perform the setting change. With regard to this manner, in the fifth embodiment of the present technology, by rotating the information processing device 100 by a given angle or more having the Y axis as a rotation axis for a given elapsed time after the pressing operation for the setting change button is performed, the set value changed by the pressing operation can return to the original value.

Accordingly, when a set value that has been changed once is cancelled, for example, the changed set value can be cancelled to as to return to the original value only by a simple operation which is rotation of the device, and thus, an operation error can be prevented. In other words, the operability when a user cancels a setting change to return to the original can be improved, and the cancellation operation of a user operation can be easily and reliably performed.

Note that, in the fifth embodiment of the present technology, the example, in which a set value changed on one display screen is turned back to the original set value, has been shown. However, when a set value is changed, for example, a case in which transition of a plurality of display screens occurs is also assumed. The fifth embodiment of the present technology can be applied also to such a case in which the transition of a plurality of display screens occurs in this manner so as to be able to return to the original display screens from display screens after transition. In other words, after transition of one or a plurality of display screens occurs according to an operation of a setting change, the information processing device 100 is rotated by a given angle or more having the Y axis as a rotation axis for a given elapsed time after the operation is performed. This rotation can return the display screens that have undergone transition by the operation to the original display screens.

6. Sixth Embodiment

In the first to fifth embodiments of the present technology, the example in which a contact operation or a proximity operation on the display face is cancelled by a rotation operation of the information processing device has been shown. Herein, a case, in which other than an operation on the display face, an operation performed by using another operation member (for example, a hard key) is desired to be cancelled, is also assumed.

Therefore, in a sixth embodiment of the present technology, a case, in which an operation performed by using a predetermined operation member is cancelled by a rotation operation of the information processing device, will be shown. Note that a configuration of the information processing device according to the sixth embodiment of the present technology is substantially the same as the example shown in FIGS. 4, 5, and the like. For this reason, the same reference numerals are given to common portions to the first embodiment of the present technology, and thus, description regarding some of the portions will be omitted.

Example of an Operation Member

As shown in FIG. 1, the information processing device 100 includes mechanical operation members such as the operation members 121 to 124, and a user can operate the information processing device 100 by pressing the operation members.

In the sixth embodiment of the present technology, with regard to a key input process, it is assumed that a procedure of pressing and then releasing the pressing an operation member is determined to be an input decision, and being pressing an operation member is determined to be being inputting.

Operation Example of the Information Processing Device

Figure 21:
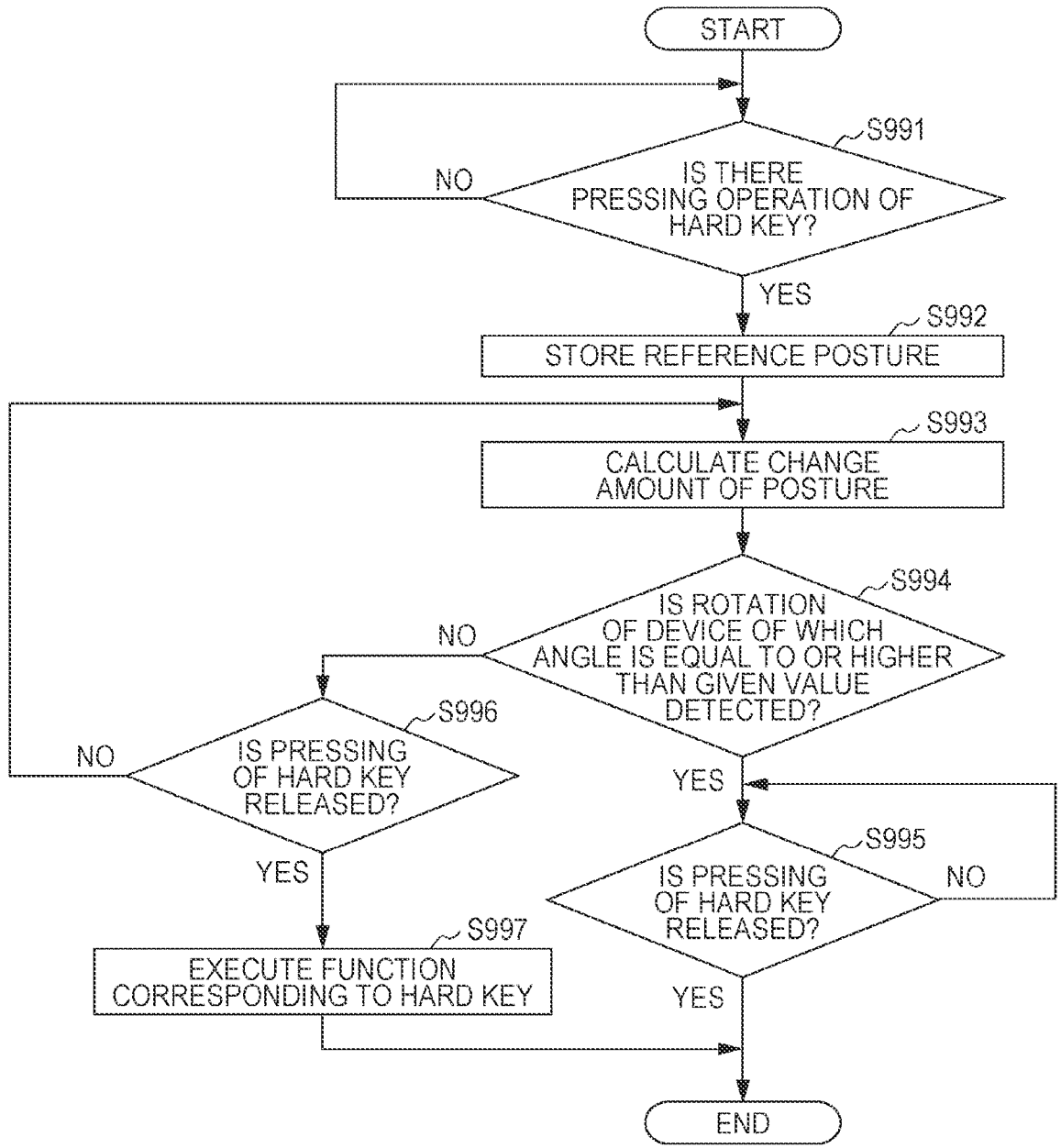
FIG. 21 is a flowchart showing an example of a procedure of an operation input process by the information processing device according to a sixth embodiment of the present technology.

FIG. 21 is a flowchart showing an example of a procedure of an operation input process by the information processing device 100 according to the sixth embodiment of the present technology. Note that, in this example, an example in which an operation performed by using a hard key is cancelled when the information processing device 100 has been rotated by a given angle or more having the Y axis as a rotation axis will be shown.

First, the control unit 270 monitors pressing of a hard key, and then determines whether or not a pressing operation of the hard key has been performed (Step S991). Information regarding the pressing is acquired from the operation reception unit 210 (input unit 112). When the pressing operation of the hard key has not been performed (Step S991), monitoring of pressing the hard key is continued. On the other hand, when the pressing operation of the hard key has been performed (Step S991), the reference posture arithmetic operation unit 230 acquires posture information when the pressing operation of the hard key is detected from the posture detection unit 220 to compute a reference posture. Then, the reference posture arithmetic operation unit 230 causes the reference posture holding unit 240 to hold reference posture information regarding the reference posture (Step S992).

Next, the rotation determination unit 250 computes a change amount from the reference posture based on the posture information output from the posture detection unit 220 and the reference posture information held in the reference posture holding unit 240 (Step S993).

Next, the rotation determination unit 250 determines whether or not the information processing device 100 has been rotated by a given angle or more based on the computed changed amount (Step S994). When the device has been rotated by the given angle or more (Step S994), the control unit 270 determines that the user has cancelled the pressing operation, and determines whether or not the pressing has been released (Step S995). When the pressing has been released, the operation of the operation input process ends. In other words, the control unit stands by until the pressing is released, and then, the pressing operation is cancelled on the condition that the pressing has been released.

In addition, when the device has not been rotated by the given angle or more (Step S994), the control unit 270 determines whether or not the pressing has been released (Step S996), and when the pressing has not been released, the process returns to Step S993. On the other hand, when the pressing has been released (Step S996), the control unit 270 executes a function assigned for the hard key of which pressing is released (Step S997).

Herein, in general, it was difficult to cancel (revoke) a key input of the hard key in the state of pressing the key. On the contrary, such a key input can be easily cancelled (revoked) in the sixth embodiment of the present technology. In addition, when the user performs cancellation during an operation of the information processing device, the cancellation can be reliably performed and the cancellation operation of a user operation can be easily performed.

In this manner, in the embodiments of the present technology, any of a contact operation, a proximity operation, a drag operation, and a flick operation on a touch panel, and a pressing operation of a hard key can be used as a user operation. Note that, when an operation other than the operations is used as a user operation, the embodiments of the present technology can be applied thereto.

In addition, in the embodiments of the present technology, the example in which a touch panel of an electrostatic type (electrostatic capacitance type) is used has been shown, but a touch panel of a pressure sensitive type (resistive membrane pressure type), an optical type, or the like may be used.

In addition, in the embodiments of the present technology, the example of the information processing device such as an imaging device and a mobile telephone has been described. However, the embodiments of the present technology can be applied to other information processing devices (electronic equipment) including a touch panel and operation members. For example, the embodiments can be applied to information processing devices (electronic equipment) such as a tablet terminal, a navigation system, and a game device.

Note that the above-described embodiments show examples for realizing the present technology, and matters described in the embodiments and matters defining the disclosure described in the claims have the corresponding relationship, respectively. In the same manner, matters defining the disclosure described in the claims and the matters described in the embodiments of the present technology to which the same names as those in the claims are given have the corresponding relationship, respectively. However, the present technology is not limited to the embodiments, and can be realized by implementing various modifications on the embodiments within the scope not departing from the gist thereof.

In addition, the procedures described in the above-described embodiments may be understood as methods having a series of the procedures, or may be understood as a program which causes a computer to execute the series of the procedures or a recoding medium in which the program is stored. As this recording medium, for example, a CD (Compact Disc), an MD (MiniDisc), a DVD (Digital Versatile Disk), a memory card, a blu-ray disc (registered trademark), or the like can be used.

Note that the present technology can also have the following configurations.

(1) An information processing device which includes a control unit that controls a process caused by a user operation to be cancelled when, setting a posture of the information processing device that is decided based on the reception of the user operation to be a reference posture, a posture of the information processing device is changed from the reference posture by a predetermined amount until a predetermined condition is satisfied.

(2) The information processing device described in (1) above, wherein the control unit determines whether or not the information processing device has been changed from the reference posture by the predetermined amount based on a change in a posture thereof during reception of the user operation.

(3) The information processing device described in (1) or (2) above, wherein, when a rotation amount of the information processing device that has a predetermined direction of the information processing device as a rotation axis is changed by the predetermined amount as a posture of the information processing device, the control unit controls so as to cancel a process caused by the user operation.

(4) The information processing device described in (3) above, wherein, even when a rotation amount of the information processing device with respect to the rotation axis is changed by the predetermined amount, and when the information processing device moves in a space as a posture of the information processing device, the control unit does not cancel a process caused by the user operation.

(5) The information processing device described in (3) or (4) above, wherein, the rotation axis and the predetermined amount are set in accordance with characteristics and use states of the information processing device.

(6) The information processing device described in any one of (1) to (5) above, wherein, when a posture of the information processing device is changed from the reference posture by the predetermined amount until the predetermined condition is satisfied, the control unit controls a process caused by the user operation to be cancelled so as to return to a display screen that was displayed at the time of receiving the user operation.

(7) The information processing device described in any one of (1) to (6) above, wherein the control unit determines that the predetermined condition is satisfied when the user operation is confirmed.

(8) The information processing device described in any one of (1) to (6) above, wherein the control unit determines that the predetermined condition is satisfied when a predetermined time elapses from the confirmation of the user operation.

(9) The information processing device described in any one of (1) to (8) above, wherein the user operation is any one of a contact operation, a proximity operation, a drag operation, and a flick operation on a touch panel, and a pressing operation of a hard key.

(10) An information processing method which includes controlling a process caused by a user operation to be cancelled when, setting a posture of the information processing device that is decided based on the reception of the user operation to be a reference posture, a posture of the information processing device is changed from the reference posture by a predetermined amount until a predetermined condition is satisfied.

(11) A computer-readable recording medium recorded with a program for causing a computer to execute control of a process caused by a user operation to be cancelled when, setting a posture of the information processing device that is decided based on the reception of the user operation to be a reference posture, a posture of the information processing device is changed from the reference posture by a predetermined amount until a predetermined condition is satisfied.

(12) A device is described that includes
processing circuitry configured to return to an initial state a selection of a user-selected feature on a user interface in response to a change in posture of the device by a predetermined amount.

(13) According to one aspect,
the user interface is a graphical user interface.

(14) According to another aspect,
the return performed by the processing circuitry cancels a selection of the user-selected feature on the graphical user interface.

(15) According to another aspect,
the initial state is a state prior to selection of the user-selected feature.

(16) According to another aspect,
the user-selected feature is a user-actuated feature.

(17) According to another aspect,
the user-selected feature is a user-specified area on the graphical user interface.

(18) According to another aspect,
the user-selected feature is a set value.

(19) According to another aspect,
the change in posture is based on a change in amount of rotation of the device.

(20) According to another aspect, the device
further includes
rotation determination circuitry that is configured to determine the change in rotation amount of the device.

(21) According to another aspect,
the rotation determination circuitry detects at least one of an acceleration, an inclination and a movement of the device.

(22) According to another aspect,
the processing circuitry is configured not to cancel the user-selected feature if the change in posture is a translatory movement of the device.

(23) According to another aspect,
user initiated contact with the graphical user interface is maintained while the processing circuitry cancels the selection based on the change in posture of the device by the predetermined amount.

(24) According to another aspect, the device further includes a touch panel on which the graphical user interface is displayed, wherein
the processing circuitry cancels a drag operation in response to the change in posture of the device by the predetermined amount.

(25) According to another aspect, the device further includes a touch panel on which the graphical user interface is displayed, wherein
the user-selected features is a contact position on the touch panel, and
the processing circuitry cancels a flick operation in response to the change in posture of the device by the predetermined amount.

(26) According to another aspect,
the graphical user interface is displayed on a proximity display, and
the return performed by the processing circuitry cancels the selection of the user-selected feature on the proximity display.

(27) According to another aspect,
the user interface includes a hard key.

(28) According to another aspect,
the return performed by the processing circuitry cancels a selection of the user-selected feature.

(29) According to an information processing method, the method includes displaying a user-selected feature on a user interface of a device; and
returning via processing circuitry the user-selected feature to an initial state in response to a change in posture of the device by a predetermined amount.

(30) According to one aspect, the method, further includes detecting the change in posture of the device by the predetermined amount.

(31) According to another aspect,
the displaying includes displaying the user selected feature on one of a touch panel, and a proximity display.

(32) According to a non-transitory computer readable storage device embodiment, the storage device has computer readable instructions stored thereon that when executed by processing circuitry perform a method, the method includes displaying a user-selected feature on a user interface of a device; and
returning via the processing circuitry the user-selected feature to an initial state in response to a change in posture of the device by a predetermined amount.

The present disclosure contains subject matter related to that disclosed in Japanese Priority Patent Application JP 2012-142951 filed in the Japan Patent Office on Jun. 26, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

100 Information processing device
110 Touch panel
111 Display unit
112 Input unit
120 Operation unit
121 to 124 Operation member
130 Sensor
140 Flash memory
150 RAM
160 CPU
170 Bus
210 Operation reception unit
220 Posture detection unit
230 Reference posture arithmetic operation unit
240 Reference posture holding unit
250 Rotation determination unit
260 Change amount holding unit
270 Control unit

The invention claimed is:

1. A display device, comprising:
a display screen; and
processing circuitry configured to:
receive a first user input on the display screen to select a feature;
control the display screen to display the selected feature in a first state, wherein the display screen is controlled based on the first user input;
determine a reference posture of the display device;
determine a speed associated with movement of the first user input on the display screen;
determine a number of scroll items on the display screen based on the determined speed, wherein
in a case where the determined speed is less than a first threshold speed, the number of scroll items on the display screen is zero,
in a case where the determined speed is equal to or more than the first threshold speed and less than a second threshold speed, the number of scroll items on the display screen is a first number of scroll items, wherein the second threshold speed is greater than the first threshold speed, and
in a case where the determined speed is equal to or more than the second threshold speed and less than a third threshold speed, the number of scroll items on the display screen is a second number of scroll items, wherein
the third threshold speed is greater than the second threshold speed, and
the second number of scroll items is greater than the first number of scroll items;
execute an animation process on the display screen based on the determined number of scroll items;
control the display screen to display the selected feature in a second state based on a termination of the animation process;
receive a second user input to rotate the display device from the reference posture to a new posture;
determine a rotation amount of the rotation of the display device between the reference posture and the new posture;
determine an operation mode of the display device is a reproduction mode;
set, based on the reproduction mode, at least one axis of rotation of the display device from a plurality of axes of rotation for cancellation of an operation corresponding to the first user input; and
control the display screen to switch the display of the selected feature to the first state from the second state based on the determined rotation amount of the rotation about the set at least one axis of rotation.

2. The display device of claim 1, wherein the display screen has a graphical user interface.

3. The display device of claim 2, wherein the processing circuitry is further configured to cancel the selection of the selected feature on the graphical user interface of the display screen based on the display of the selected feature in the first state.

4. The display device of claim 3, wherein the processing circuitry is further configured to maintain a user initiated contact with the graphical user interface at a time of the cancellation of the selection based on the rotation from the reference posture of the display device by the rotation amount.

5. The display device of claim 2, wherein the selected feature is a user-specified area on the graphical user interface.

6. The display device of claim 2, wherein the selected feature is a set value.

7. The display device of claim 2, further comprising:
a touch panel configured to display the graphical user interface, wherein
the selected feature corresponds to a contact position of the first user input on the touch panel, and
the processing circuitry is further configured to cancel a drag operation on the graphical user interface based on the rotation from the reference posture of the display device by the rotation amount.

8. The display device of claim 2, further comprising
a touch panel configured to display the graphical user interface,
wherein the processing circuitry is further configured to cancel a flick operation on the graphical user interface based on the rotation from the reference posture of the display device by the rotation amount.

9. The display device of claim 2, wherein
the graphical user interface is displayed on a proximity display, and
the processing circuitry is further configured to cancel the selection of the selected feature on the proximity display based on the display of the selected feature in the first state.

10. The display device of claim 1, wherein the selected feature is a user-actuated feature.

11. The display device of claim 1, further comprising rotation determination circuitry configured to determine the rotation amount of the display device from the reference posture.

12. The display device of claim 11, wherein the rotation determination circuitry is further configured to detect at least one of an acceleration of the display device, an inclination of the display device or a movement of the display device.

13. The display device of claim 1, wherein the processing circuitry is further configured to maintain the selection of the selected feature based on a translatory movement of the display device.

14. The display device of claim 1, wherein the display device includes a hard key.

15. The display device of claim 1, wherein the plurality of axes of rotation includes an X-axis, a Y-axis, or a Z-axis.

16. The display device of claim 1, wherein the processing circuitry is further configured to:
determine the operation mode of the display device is one of a photographing mode or the reproduction mode;
set the at least one axis of rotation based on the determined operation mode of the display device, and a type of the display device;
in a case where the type of the display device is an imaging device and the operation mode of the display device is the photographing mode, set at least one of an X-axis or a Y-axis as the at least one axis of rotation of the display device for the cancellation of the operation;
in a case where the type of the display device is the imaging device and the operation mode of the display device is the reproduction mode, set a Z-axis as the at least one axis of rotation of the display device for the cancellation of the operation; and
in a case where the type of the display device is a mobile device, set the Z-axis as the at least one axis of rotation of the display device for the cancellation of the operation.

17. An information processing method, comprising:
receiving a first user input on a display screen to select a feature;
controlling the display screen to display the selected feature in a first state, wherein the display screen is controlled based on the first user input;
determining a reference posture of a display device;
determining a speed associated with movement of the first user input on the display screen;
determining a number of scroll items on the display screen based on the determined speed, wherein
in a case where the determined speed is less than a first threshold speed, the number of scroll items on the display screen is zero,
in a case where the determined speed is equal to or more than the first threshold speed and less than a second threshold speed, the number of scroll items on the display screen is a first number of scroll items, wherein the second threshold speed is greater than the first threshold speed, and
in a case where the determined speed is equal to or more than the second threshold speed and less than a third threshold speed, the number of scroll items on the display screen is a second number of scroll items, wherein
the third threshold speed is greater than the second threshold speed, and
the second number of scroll items is greater than the first number of scroll items;
executing an animation process on the display screen based on the determined number of scroll items;
controlling the display screen to display the selected feature in a second state based on a termination of the animation process;
receiving a second user input to rotate the display device from the reference posture to a new posture;
determining a rotation amount of the rotation of the display device between the reference posture and the new posture;
determining an operation mode of the display device is a reproduction mode;
setting, based on the reproduction mode, at least one axis of rotation of the display device from a plurality of axes of rotation for cancellation of an operation corresponding to the first user input; and
controlling the display screen to switch the display of the selected feature to the first state from the second state based on the determined rotation amount of the rotation about the set at least one axis of rotation.

18. A non-transitory computer-readable storage medium having stored thereon computer-executable instructions which, when executed by a processing circuitry, cause the processing circuitry to execute operations, the operations comprising:
receiving a first user input on a display screen to select a feature;
controlling the display screen to display the selected feature in a first state, wherein the display screen is controlled based on the first user input;
determining a reference posture of a display device;
determining a speed associated with movement of the first user input on the display screen;
determining a number of scroll items on the display screen based on the determined speed, wherein
in a case where the determined speed is less than a first threshold speed, the number of scroll items on the display screen is zero,
in a case where the determined speed is equal to or more than the first threshold speed and less than a second threshold speed, the number of scroll items on the display screen is a first number of scroll items, wherein the second threshold speed is greater than the first threshold speed, and
in a case where the determined speed is equal to or more than the second threshold speed and less than a third threshold speed, the number of scroll items on the display screen is a second number of scroll items, wherein
the third threshold speed is greater than the second threshold speed, and
the second number of scroll items is greater than the first number of scroll items;
executing an animation process on the display screen based on the determined number of scroll items;
controlling the display screen to display the selected feature in a second state based on a termination of the animation process;
receiving a second user input to rotate the display device from the reference posture to a new posture;
determining a rotation amount of the rotation of the display device between the reference posture and the new posture;
determining an operation mode of the display device is a reproduction mode;
setting, based on the reproduction mode, at least one axis of rotation of the display device from a plurality of axes of rotation for cancellation of an operation corresponding to the first user input; and
controlling the display screen to switch the display of the selected feature to the first state from the second state based on the determined rotation amount of the rotation about the set at least one axis of rotation.

* * * * *